(12) United States Patent
Ma et al.

(10) Patent No.: US 9,202,261 B2
(45) Date of Patent: Dec. 1, 2015

(54) IMAGE PROCESSING APPARATUS AND METHOD

(75) Inventors: Hongfeng Ma, Beijing (CN); Pin Zhang, Beijing (CN); Yanli Wang, Beijing (CN); Hitoshi Yamagata, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 870 days.

(21) Appl. No.: 13/402,435

(22) Filed: Feb. 22, 2012

(65) Prior Publication Data

US 2012/0213451 A1 Aug. 23, 2012

(30) Foreign Application Priority Data

Feb. 22, 2011 (CN) .......................... 2011 1 0045243

(51) Int. Cl.
*G06T 5/00* (2006.01)
*G06T 5/50* (2006.01)

(52) U.S. Cl.
CPC . *G06T 5/002* (2013.01); *G06T 5/50* (2013.01); *G06T 2207/30004* (2013.01)

(58) Field of Classification Search
USPC ................................................. 382/260–266
See application file for complete search history.

(56) References Cited

U.S. PATENT DOCUMENTS

| 6,725,174 | B2 | 4/2004 | Bouts et al. | |
| 2001/0031069 | A1* | 10/2001 | Kondo et al. | 382/107 |
| 2007/0031058 | A1* | 2/2007 | Hatzinakos et al. | 382/265 |

OTHER PUBLICATIONS

Pavel Mrazek, "Selection of Optimal Stopping Time for Nonlinear Diffusion Filtering", Scale-Space and Morphology in Computer Vision, Third International Conference, Scale-Space 2001, Vancouver, Canada, pp. 290-298, ©Springer-Verlag, Sponsored by IEEE Computer Society (PAMI).
Pietro Perona et al., "Scale-space and edge detection using anisotropic diffusion", Electrical Engineering and Computer Science Department, Dec. 20, 1988, pp. 1-30.
Combined Office Action and Search Report issued Apr. 23, 2014 in Chinese Patent Application No. 201110045243.3 (with English translation).
Hongwei Guo, Research on Filtering Algorithm for Salt-and-Pepper Noise in Digital Image, Yunnan University (China), Dec. 2010, pp. 40-46.
Pavel Mrázek, "Selection of Optimal Stopping Time for Nonlinear Diffusion Filtering", International Journal of Computer Vision, vol. 52, No. 2-3, May 2003, pp. 189-203.
Liu Peng, et al., "The Selection of Optimal Stopping Time Based on Synchronous Iteration of Noise and Image in Diffusion Image Denoise", Journal of Electronics & Information Technology, vol. 31, No. 9, Sep. 2009 (with English abstract).

* cited by examiner

*Primary Examiner* — Wesley Tucker
(74) *Attorney, Agent, or Firm* — Oblon, McClelland, Maier & Neustadt, L.L.P.

(57) ABSTRACT

The disclosure provides an image processing apparatus and method. The image processing apparatus may include: a filter for performing an iterative filtering on an input image; and an iterative filtering stopping device for determining whether to stop the iterative filtering according to a variation speed of the filtered image obtained from each iteration of the iterative filtering with increasing of iteration times.

18 Claims, 14 Drawing Sheets

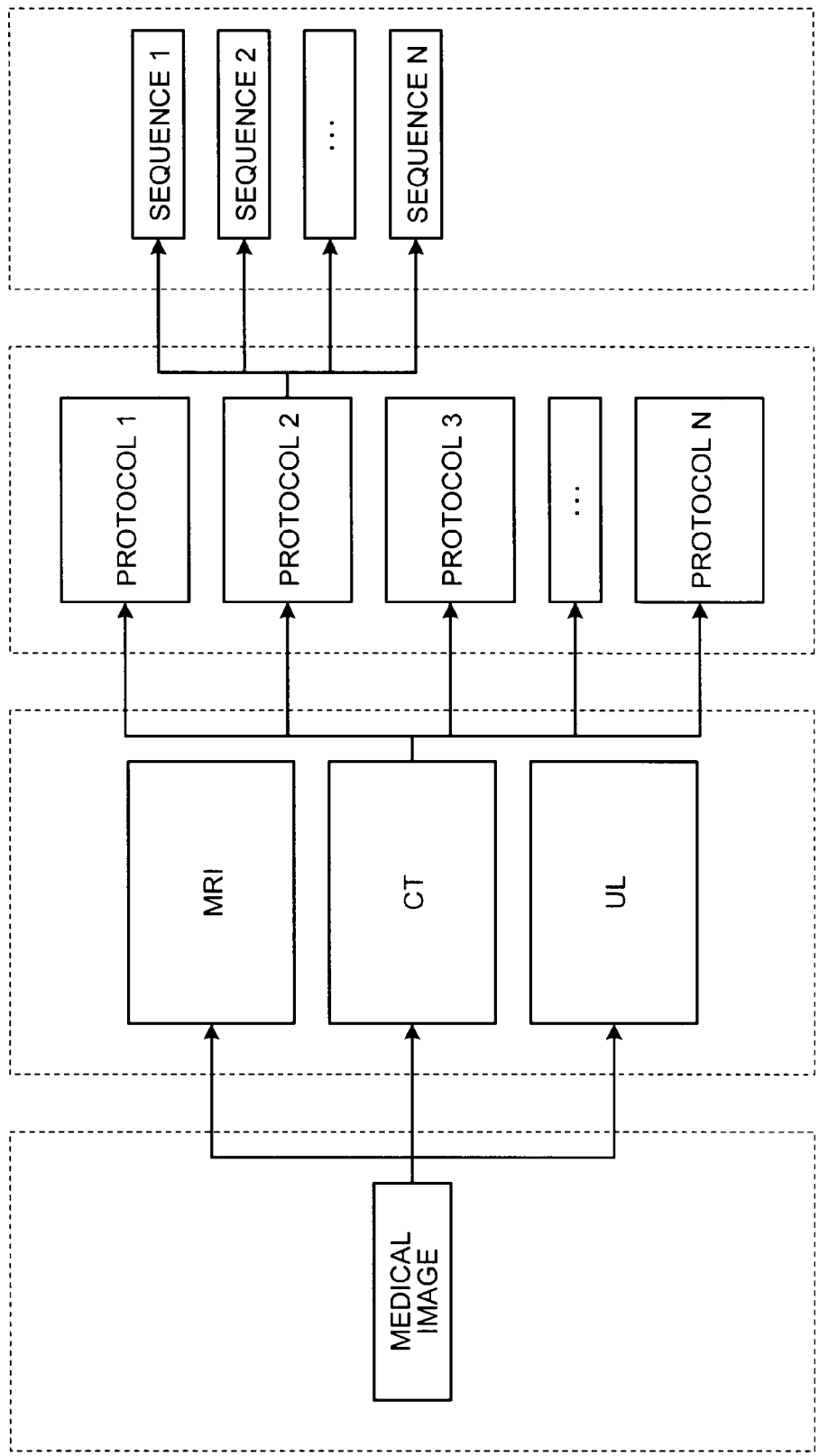

MINIMAL VALUE AT t=0.4

IMAGE PROCESSING APPARATUS AND METHOD

CROSS-REFERENCE TO RELATED APPLICATIONS

This application is based upon and claims the benefit of priority from Chinese Patent Application No. 201110045243.3, filed on Feb. 22, 2011, the entire contents of which are incorporated herein by reference.

FIELD

The disclosure relates to the field of image processing, and more particularly to image processing apparatus and method for the noise reduction of an image (e.g. a medical image).

BACKGROUND

Image noise reduction is an important link in image processing. For example, during the processing of a medical image, due to the problems such as inadequate signal detection performance and imaging algorithm of an apparatus, low dosage of scanning agent and the like, noise is generally contained in a medical image obtained by a computed tomography (CT) apparatus, a magnetic resonance imaging (MRI) apparatus, an ultrasound (UL) diagnostic apparatus and other medical apparatuses. The noise in such images will cause a severe influence on the diagnosis of a doctor as well as an influence on the accuracy of the subsequent image processing (e.g. image segmentation, image measurement and volume rending).

BRIEF DESCRIPTION OF THE DRAWINGS

The above-mentioned and other objects, features and advantages of the disclosure will be more readily understood by reference to the description on the following embodiments of the disclosure when considered in connection with the appended drawings. The components shown in the appended drawings are only for illustrating the principle of the disclosure, and in the appended drawings, identical or similar technical features or components are represented with identical or similar appended drawing reference signs.

FIG. 7 is a schematic diagram illustrating an exemplary application scenario of an embodiment of the disclosure;

DETAILED DESCRIPTION

Figure 1:
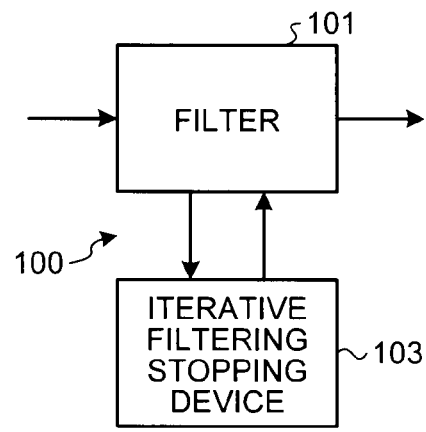
FIG. 1 is a block diagram illustrating the structure of an image processing apparatus according to an embodiment of the disclosure.

Some aspects of the disclosure are described below in brief for a basic understanding of the disclosure. The description is merely intended to define, in a simplified way, some concepts as the preamble of the following detailed description, but not to determine the key or important parts of the disclosure or limit the scope of the disclosure.

According to an aspect of the disclosure, there is provided an image processing apparatus which may include: a filter for performing an iterative filtering on an input image; and an iterative filtering stopping device for determining whether to stop the iterative filtering according to the variation speed of the filtered image obtained from each iteration of the iterative filtering with the increasing of iteration times.

According to another aspect of the disclosure, there is provided an image processing method which may include: performing an iterative filtering on an input image; and determining whether to stop the iterative filtering according to the variation speed of the filtered image obtained from each iteration of the iterative filtering with the increasing of iteration times.

Furthermore, an embodiment of the disclosure further provides a computer program for realizing the image processing method.

Additionally, an embodiment of the disclosure further provides a computer program product in the form of a medium at least readable to a computer, on which computer program codes for realizing the image processing method are recorded.

Preferred embodiments of the disclosure are described below with reference to appended drawings. The elements and features described in one of the appended drawings or implementation modes of the disclosure may be combined with those shown in one or more other appended drawings or implementation modes. It should be noted that for the sake of clarity, the representation and description of the components and processing that are irrelative with this invention but well known by those skilled in this art are omitted.

In image processing, an image may be subjected to an iterative filtering before being processed so as to filter out as much noise from the image as possible. Noise reduction may not achieve an ideal effect if few times of iteration are performed, on the other hand, however, if too may times of iteration are performed, the useful information in the image will be smoothed, leading to the blurring of the image which may have adverse influence on the subsequent processing. Some embodiments of the disclosure provide an image processing apparatus and method capable of determining an appropriate iterative filtering stopping time during an iterative filtering process.

It should be appreciated that the apparatus and method provided in the embodiments of the disclosure are applicable to noise reduction on various types of images, for example, a medical image formed by the data obtained by a medical diagnostic imaging device for a person subjected to physical examination. The medical diagnostic apparatus herein includes but is not limited to: X-ray imaging diagnostic apparatus, ultrasound (UL) imaging diagnostic apparatus, computed tomography (CT) apparatus, magnetic resonance imaging (MRI) diagnostic apparatus, positron emission tomography (PET) apparatus and the like. FIG. 7 is a schematic diagram illustrating the acquisition of a medical image by a medical diagnostic apparatus. As shown in FIG. 7, there are provided several predetermined or user-defined scanning protocols for each type of imaging apparatus (e.g. the aforementioned medical diagnostic apparatuses). Taking CT as an example, it may be provided with cardiac synchronization scanning protocol, abdominal 4-phase enhance scanning protocol, dynamic scanning protocol and the like, referring to the protocols 1, 2 . . . N (N≥1) shown in FIG. 7; and a plurality of image sequences (for example, the sequences 1, 2 . . . N shown in FIG. 7) can be obtained by using one of such protocols. Therefore, the image to be processed may be a medical image that is formed by the patient data obtained by a medical diagnostic apparatus based on a corresponding protocol.

Figure 2:
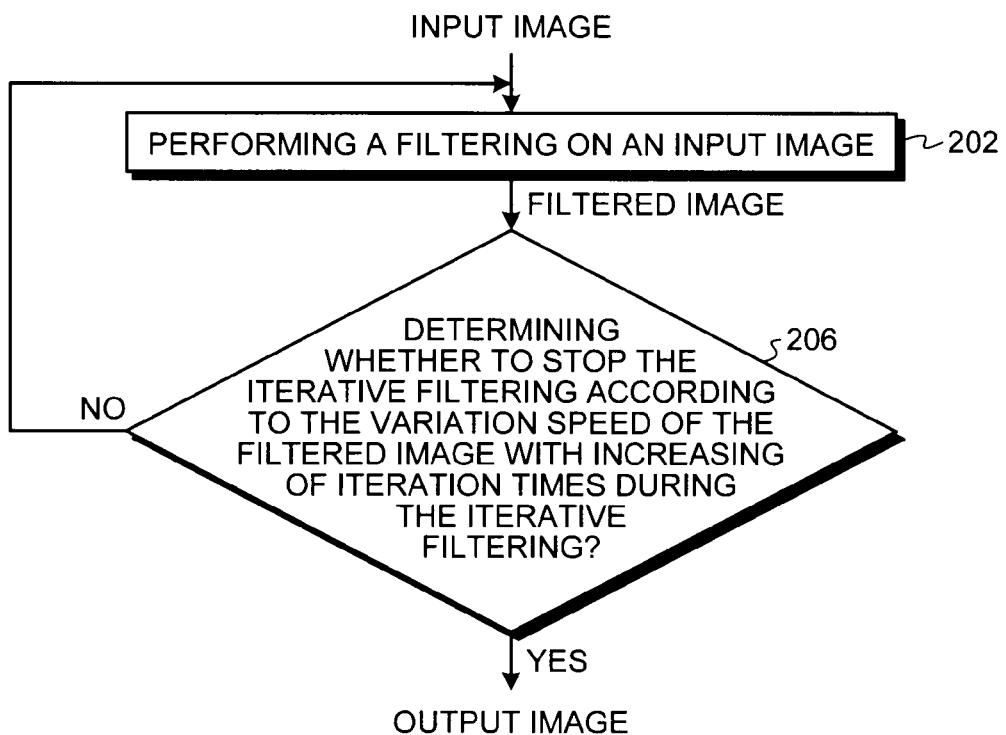
FIG. 2 is a schematic diagram illustrating the flow of an image processing method according to the embodiment of FIG. 1.

FIG. 1 is a block diagram illustrating the structure of an image processing apparatus according to an embodiment of the disclosure, and FIG. 2 is a schematic diagram illustrating the flow of an image processing method according to the embodiment of the FIG. 1.

As shown in FIG. 1, the image processing apparatus 100 may include a filter 101 and an iterative filtering stopping device 103. The image processing apparatus 100 can perform an image filtering by using the method shown in FIG. 2. And the functions of each device of the image processing apparatus 100 are described below with reference to the flow of the method shown in FIG. 2.

The filter 101 is configured to perform an iterative filtering on an input image input to the image processing apparatus (Step 2-2 shown in FIG. 2). The filter 101 may use any appropriate filtering method selected based on an actual application scenario, such as non-linear diffusion filtering (NLD) method, linear filtering method, anisotropic diffusion (ATD) method and the like, which should be not limited to any particular filtering method here.

The filter 101 outputs the filtered image obtained from each iteration to the iterative filtering stopping device 103. The iterative filtering stopping device 103 is configured to determine whether to stop the iterative filtering according to the filtered image obtained from each iteration. Specifically, the iterative filtering stopping device 103 may determine whether to stop the iterative filtering according to the variation speed (in the disclosure the term "speed" refers to the magnitude of velocity) of the filtered image with the increase of the iteration times during the filtering process (Step 206 shown in FIG. 2). For instance, if the iterative filtering stopping device 103 determines that the variation speed of the filtered image drops to a predetermined threshold or even lower, which means that at this moment the filtering operation causes little influence on the image, in other words, there is little noise to be filtered out, then the iterative filtering stopping device indicates the filter 101 to stop the iterative filtering, otherwise, the iterative filtering stopping device indicates the filter 101 to perform the next iteration.

The variation of the filtered image herein refers to the difference between the filtered image obtained from the current filtering iteration and that obtained from a previous filtering iteration (a previous filtering iteration refers to a filtering iteration performed before the current iteration, e.g. the iteration immediately before the current iteration, and should not be limited any particular former iteration). During the iterative filtering process, the variation (difference) between the filtered image obtained from each iteration and that obtained from the previous iteration is decreased with the increase of iteration times. That is, the variation speed of the filtered image decreases with the increase of the iteration times. The apparatus and method shown in FIG. 1 and FIG. 2 determine, based on this principle, the iterative filtering stopping time according to the variation speed of the filtered image. By adopting the method and apparatus provided in this disclosure, an appropriate iterative filtering stopping time can be effectively determined, thereby most noise of the filtered image may be filter out while useful information in the image may be prevented from being blurred. In addition, the trouble of manually setting the iterative filtering stopping time may be avoided, which improves the automation of the image processing.

The variation of the filtered image during the iteration process may be reflected in different characteristics or features of the filtered image, such as (not limited to) the variation of the correlation between the filtered image and the noise image obtained from each iteration during the iteration process, the variation of an image feature (e.g. the variance or standard deviation) value of the filtered image or the noise image and the like, or any mathematical combination of the variations mentioned above. Several specific embodiments of the image processing apparatus and method for determining whether to stop an iterative filtering according to the variation speed of a filtered image during the iterative filtering process are described below with reference to the FIGS. 3-15.

Figure 3:
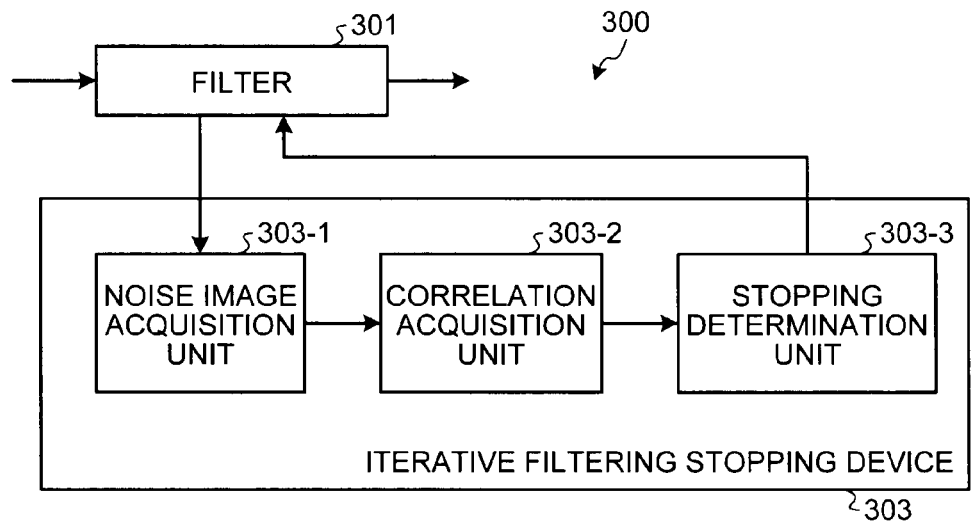
FIG. 3 is a block diagram illustrating the structure of an image processing apparatus according to a specific embodiment of the disclosure.
Figure 4:
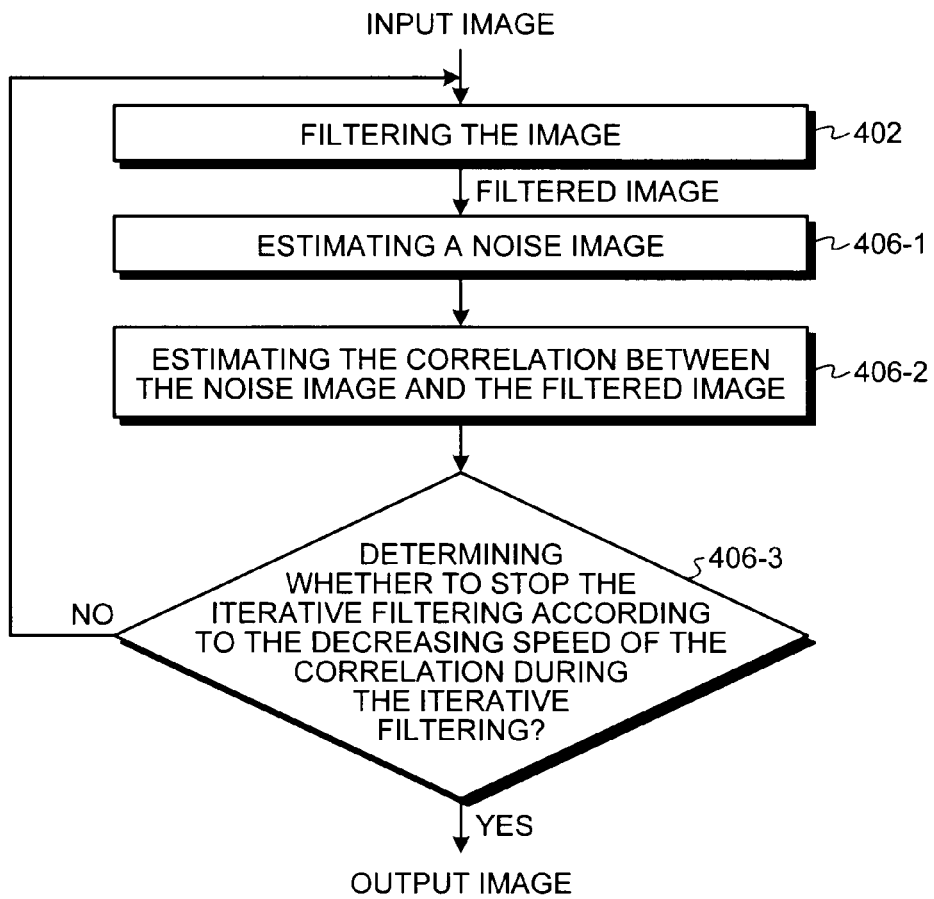
FIG. 4 is a schematic diagram illustrating the flow of an image processing method according to the specific embodiment of FIG. 3.

FIG. 3 is a block diagram illustrating the structure of an image processing apparatus according to a specific embodiment of the disclosure, and FIG. 4 is a schematic diagram illustrating the flow of an image processing method according to the specific embodiment of the FIG. 3.

Figure 6A:
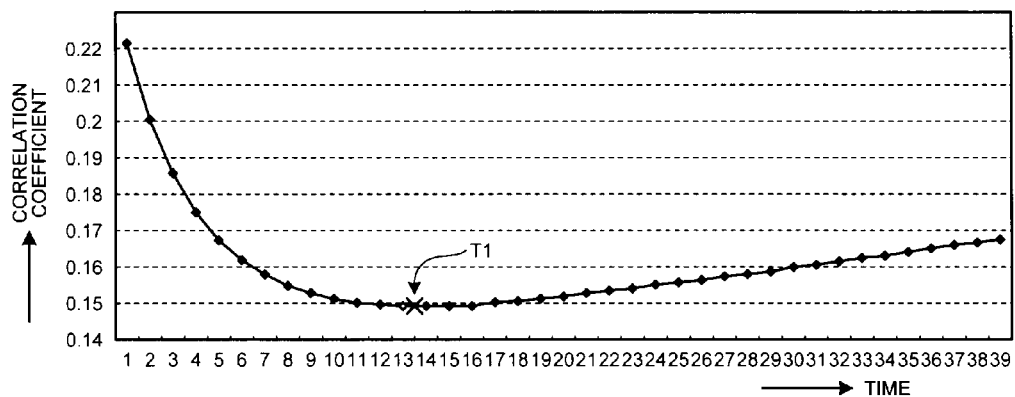
FIGS. 6A, 6B and 6C are schematic diagrams which respectively illustrate the curves reflecting the variation of the correlation coefficient between a filtered image and a noise image during the iterative filtering process of different types of images.
Figure 6B:
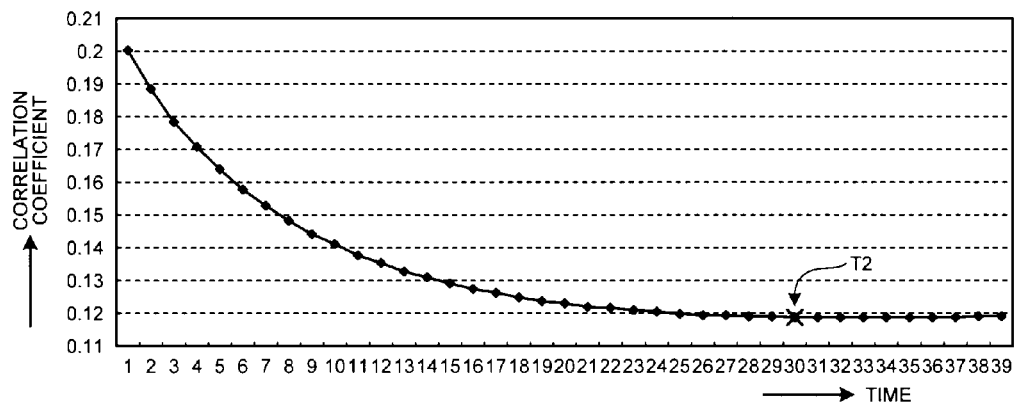
Figure 6C:
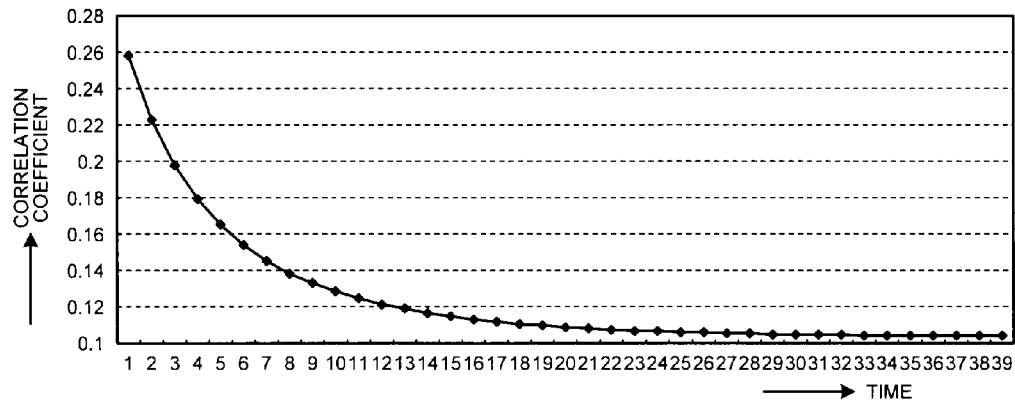

As mentioned above, during the iterative filtering process, comparing the filtered image obtained from each iteration with that obtained from the previous iteration, the variation therebetween decreases with the increasing of the times of the iterations, that is, the variation speed of the filtered image decreases during the iterative filtering. At the initial stage of the iterative filtering, much noise is filtered out by each iteration, and with the increase of iteration times, the noise in the image becomes less and less, and the filtered image itself is smoothed gradually. The variation speed of the filtered image is proportional to the gradient of the filtered image. The gradient of the filtered image decreases as the filtered image is gradually smoothed, and thus the variation speed of the filtered image declines. Accordingly, since the noise remained in the filtered image decreases during the iterations, the correlation between the filtered image and the noise image varies. In other words, the variation of the correlation also reflects the variation of the filtered image, and the variation speed of the correlation reflects the variation speed of the filtered image. FIGS. 6A, 6B and 6C respectively illustrate the exemplary curves reflecting the variation of the correlation during the iterative filtering process. The curves in FIGS. 6A, 6B and 6C respectively represent the variation trend of the correlation coefficient between the filtered image obtained from each iteration and the corresponding noise image against the time (iteration times) during the iterative filtering processes of three different types of images (in the examples shown in FIGS. 6A, 6B and 6C, the three types of images are medical images respectively obtained by an UL, a CT and an MRI apparatus from different parts of a human body). As shown in FIGS. 6A and 6B, the correlation coefficient between the filtered image and the noise image shows a trend of decline at the initial stage of the iterative filtering, which indicates that more and more noise has been filtered out. Then after a period of time, the curve of the correlation coefficient drops to the troughs (e.g. the troughs T1 and T2 that are represented by 'x' in the figures). Then, the correlation coefficient between the filtered and the noise image is in a slowly-rising trend again, which indicates that after the troughs useful information in the filtered image is gradually smoothed with the increasing of iteration times, that is, some of the useful information is filtered out (or some useful information is filtered out so as to be included in the noise image). Accordingly, the correlation between the filtered image and the noise image is increases after the trough. An existing method determines the iterative filtering stopping time by searching the troughs. In the existing method, the time point at which the correlation coefficient between the filtered image and the noise image is minimal is determined to be the iterative filtering stopping time point. Reference may be made to the following document: Pavel Mrázek, '*Selection of Optimal Stopping time for Nonlinear Diffusion filtering*' ('Scale-Space and Morphology in Computer Vision', Third International Conference, Scale-Space 2001) (hereinafter referred to as related document 1). In the example shown in FIG. 6A, there is one trough T1, the position of which corresponds to the correct stopping time, and thus in this example the correct stopping time can be determined by the existing method. However, this existing method is not applicable to the examples shown in FIGS. 6B and 6C. For example, in the curve shown in FIG. 6B, the trough T2 is later than the correct stopping time, and after the trough T2 the curve of the correlation coefficient is steady (namely, the value of the correlation coefficient is almost unaltered after the trough T2). As a result, in this case the time point determined by this existing method is the trough T2 rather than the correct stopping time. For another example, the curve shown in FIG. 6C descends monotonically and there thus exists no trough. Accordingly, in this case no time point corresponding to the minimal correlation coefficient can be found by using the existing method, so that the correct stopping time can not be determined.

The applicant of the disclosure found that, the three curves in FIGS. 6A, 6B and 6C each descend monotonically at the initial stage of the iterative filtering process and the decline speed becomes slower and slower at this initial stage, no matter there exists a trough or not, as shown in FIGS. 6A, 6B and 6C. In the apparatus and method shown in FIG. 3 and FIG. 4, the iterative filtering stopping time is determined using the decreasing speed (not the time point at which the correlation is lowest) of the correlation between the filtered and the noise image during the iterative filtering process.

As shown in FIG. 3, an image processing apparatus 300 may include a filter 301 and an iterative filtering stopping device 303. The iterative filtering stopping device 303 may include a noise image acquisition unit 303-1, a correlation acquisition unit 303-2 and a stopping determination unit 303-3. The image processing apparatus 300 may perform an image filtering by using the method shown in FIG. 4. And the functions of each device of the image processing apparatus 300 are described below by reference to the flow of the method shown in FIG. 4.

Similar to the filter 101 shown in FIG. 1, the filter 301 is configured to perform an iterative filtering on an input image input to the image processing apparatus (Step 402 shown in FIG. 4) by utilizing any appropriate method, the description of which is not repeated here.

The filter 301 outputs the filtered image obtained from each iteration to the noise image acquisition unit 303-1. The noise image acquisition unit 303-1 is configured to evaluate, after each iteration, the noise image according to the obtained filtered image and the input image (Step 406-1 shown in FIG. 4).

As an example, the difference image between the filtered image obtained from each iteration and the input image can be calculated and utilized as the corresponding noise image. Supposing $I_o$ represents the input image and $I_{st}$ represents the filtered image obtained from the current filtering iteration, then the corresponding noise image $I_{nt}$ can be estimated according to the following formula:

$$I_{nt}=I_o-I_{st} \qquad (1)$$

It should be appreciated that, the noise image after each iteration can be estimated by any other appropriate method including utilizing any mathematical variations of formula (1). For example, the absolute value of the difference image calculated in accordance with formula (1) may be used, that is, $I_{nt}=|I_o-I_{st}|$. Other appropriate estimation methods are not enumerated here. The disclosure is not limited to the particular examples.

The noise image acquisition unit 303-1 outputs the obtained noise image to the correlation acquisition unit 303-2. The correlation acquisition unit 303-2 may estimate the correlation between the noise image and the filtered image obtained from the current iteration (Step 406-2 shown in FIG. 4) and output the result of the estimation to the stopping determination unit 303-3.

As an example, the correlation coefficient between the noise image and the filtered image can be calculated to represent the correlation between the two images. For example, the correlation between the two images can be calculated according to the following formula:

$$\rho_t = \frac{E\{[I_{nt}-E(I_{nt})][I_{st}-E(I_{st})]\}}{\sqrt{E[I_{nt}-E(I_{nt})]^2} \cdot \sqrt{E[I_{st}-E(I_{st})]^2}} \qquad (2)$$

wherein, $\rho_t$ represents the correlation coefficient between the filtered image obtained from the current iteration and the corresponding noise image $I_{nt}$, and $E(\bullet)$ represents the mean value function.

It should be appreciated that in addition to the correlation coefficient mentioned above, the correlation between the two images can be represented by other parameters, including any form of mathematical variations of formula (2), and the disclosure is not limited to this example.

The stopping determination unit 303-3 is configured to determine whether to stop the iterative filtering according to the decreasing speed of the correlation between the filtered image obtained from each iteration and the noise image (Step 406-3 shown in FIG. 4). If determining the decreasing speed of the correlation is smaller than or equal to a predetermined value, the stopping determination unit 303-3 indicates the filter 301 to stop the iterative filtering, otherwise, indicates the filter 301 to perform the next iteration.

Figure 5:
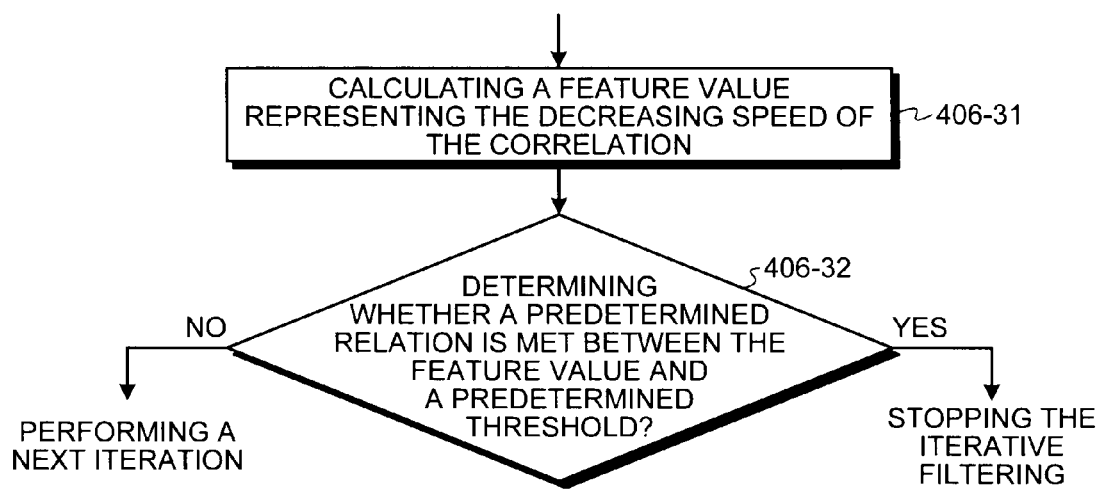
FIG. 5 is a schematic diagram illustrating the flow of a specific example of determining an iterative filtering stopping time.

FIG. 5 shows an example of determining the iterative stopping time according to a feature value representing the decreasing speed of the correlation. As shown in FIG. 5, in Step 406-31 the stopping determination unit 303-3 calculates a feature value, which represents the decreasing speed of the correlation with the increase of iteration times, according to the value of the correlation between the filtered image and the noise image obtained from the current iteration and the value of the correlation estimated in the previous iteration. Then, in Step 406-32, the stopping determination unit 303-3 determines whether a predetermined condition between the feature value and a predetermined threshold is met, and if yes, stops the iterative filtering, otherwise, continues to perform the next iteration.

As a specific example, the feature value representing the decreasing speed of the correlation may be the inclination of the curve (the correlation coefficient curve shown in FIG. 6A, 6B or 6C) representing the variation of the correlation between the filtered image and the noise image with iteration times. For example, the inclination $\theta$ may be calculated according to the following formula:

$$\theta = \arctan \frac{\rho_t - \rho_{t-\Delta t}}{\Delta t} \cdot \frac{180}{\pi} \quad (3)$$

wherein $\rho_t$ represents the correlation coefficient between the filtered image $I_{st}$ and the corresponding noise image $I_{nt}$ obtained at time t, $\rho_{t-\Delta t}$ represents the correlation coefficient between the filtered image $I_{s(t-\Delta t)}$ and the corresponding noise image $I_{n(t-\Delta t)}$ obtained at time t−Δt. Δt represents a time interval.

As another specific example, the inclination may be represented by radian of the curve:

$$\theta_{rad} = \arctan \frac{\rho_t - \rho_{t-\Delta t}}{\Delta t} \quad (4)$$

If determining the calculated inclination $\theta_{rad}$ or $\theta$ is smaller than or equal to a predetermined threshold, the stopping determination unit 303-3 indicates the filter 301 to stop the iterative filtering, otherwise, indicates the filter 301 to perform the next iteration.

As another specific example, the feature value may be the slope of the curve (the correlation coefficient curve shown in FIG. 6A, 6B or 6C) representing the variation of the correlation between the filtered image and the noise image with the increase of the iteration times. For example, the slope $k_{slope}$ may be calculated according to the following formula:

$$k_{slope} = \frac{\rho_t - \rho_{t-\Delta t}}{\Delta t} \quad (5)$$

wherein $\rho_t$ represents the correlation coefficient between the filtered image $I_{st}$ and the corresponding noise image $I_{nt}$ obtained at time T, $\rho_{t-\Delta t}$ represents the correlation coefficient between the filtered image and the corresponding noise image $I_{s(t-\Delta t)}$ obtained at time t−Δt. Δt represents a time interval.

If determining the calculated slope $k_{slope}$ is smaller than or equal to a predetermined threshold, the stopping determination unit 303-3 indicates the filter 301 to stop the iterative filtering, otherwise, indicates the filter 301 to perform the next iteration.

It should be noted that the feature value representing the decreasing speed of the correlation between the filtered image and the noise image during the iterative filtering process may be any other feature value that may represent the decreasing speed of the correlation, and should not be limited to the inclination and the slope of the correlation coefficient curve above. For instance, the difference (or the reciprocal of the difference) between the correlation coefficient $\rho_t$ estimated after the current iteration and the correlation coefficient $\rho_{t-\Delta t}$ estimated after the previous iteration can be used as the feature value; the iterative filtering is stopped if the difference is determined to be smaller than or equal to a predetermined threshold (or the reciprocal of the difference is determined to be greater than or equal to a predetermined threshold), otherwise, the next iteration is performed. Moreover, the aforementioned feature values may be calculated by using any forms of mathematical variations thereof.

Additionally, it should be appreciated that the predetermined threshold mentioned in the embodiment/example above may be predetermined according to an actual application scenario, for example, it can be an experimental value or empirical value resulting from an analysis on images of different types (or features). Different threshold values may be used in different application scenarios or when different feature value parameters are adopted. For instance, in the case where the input image is a medical image formed by the data obtained by a medical diagnostic apparatus, a corresponding threshold can be predetermined for each type of scanning protocol or imaging device based on experiments or experience. Optionally, a plurality of thresholds (for example, in the form of a configuration file) for a plurality of scanning protocols or imaging devices may be stored in a storage unit (built in the image processing apparatus or located outside and accessible to the image processing apparatus). In this way, a corresponding threshold can be acquired (for example, read from the storage unit) during the iterative filtering process according to the type of the scanning protocol of the input image or the type of an imaging device to serve as the basis for determining the decreasing speed of the correlation. In this way the automation of image processing may be improved.

In the image processing apparatus or method illustrated in FIGS. 3-5, by using the decreasing speed of the correlation between the filtered image and the noise image, the iterative filtering stopping time can be effectively determined, so that the useful information in the filtered image is guaranteed not to be smoothed while most noise is filtered out from the filtered image.

Figure 8:
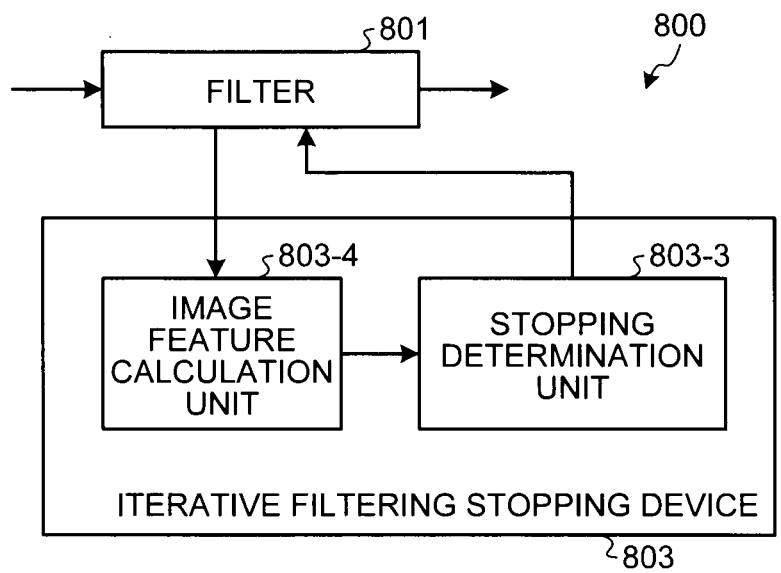
FIG. 8 is a block diagram illustrating the structure of an image processing apparatus according to another specific embodiment of the disclosure.
Figure 9:
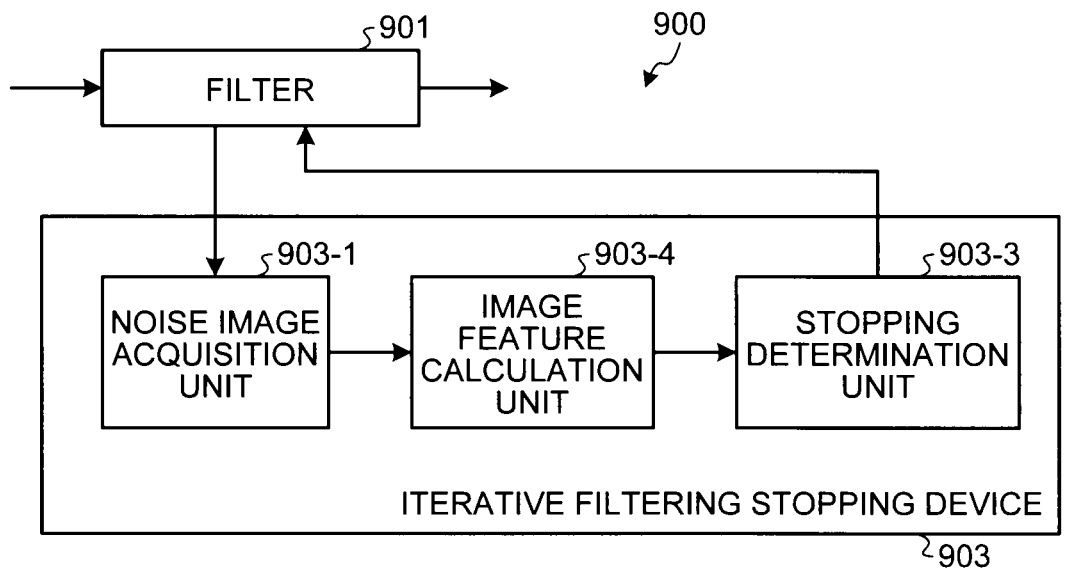
FIG. 9 is a block diagram illustrating the structure of an image processing apparatus according to another specific embodiment of the disclosure.
Figure 10:
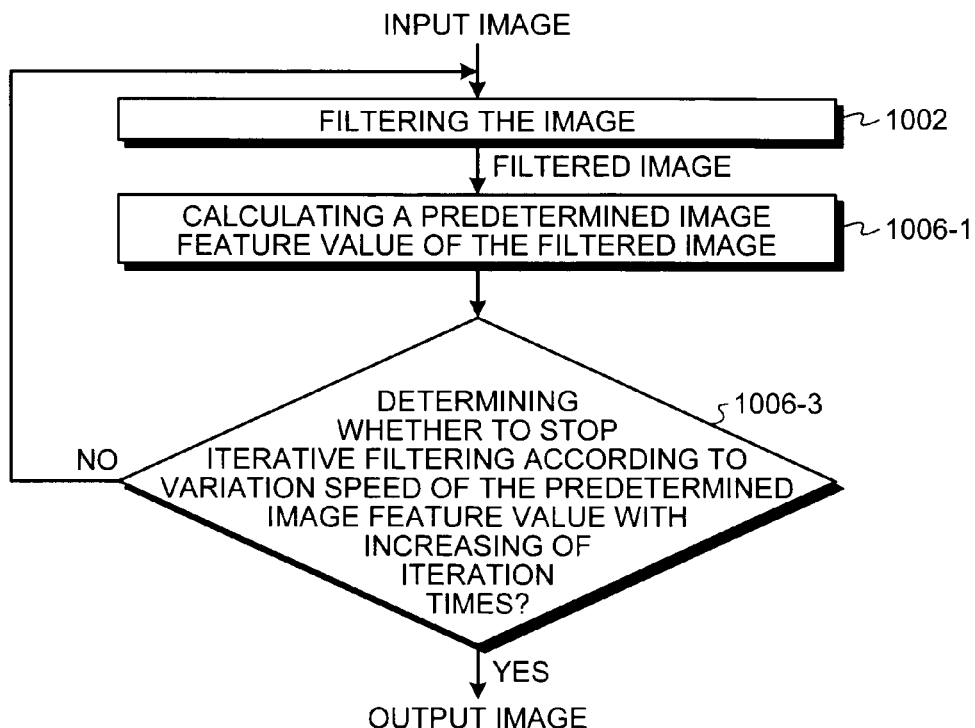
FIG. 10 is a schematic diagram illustrating the flow of the image processing method shown in the embodiment of FIG. 8.
Figure 11:
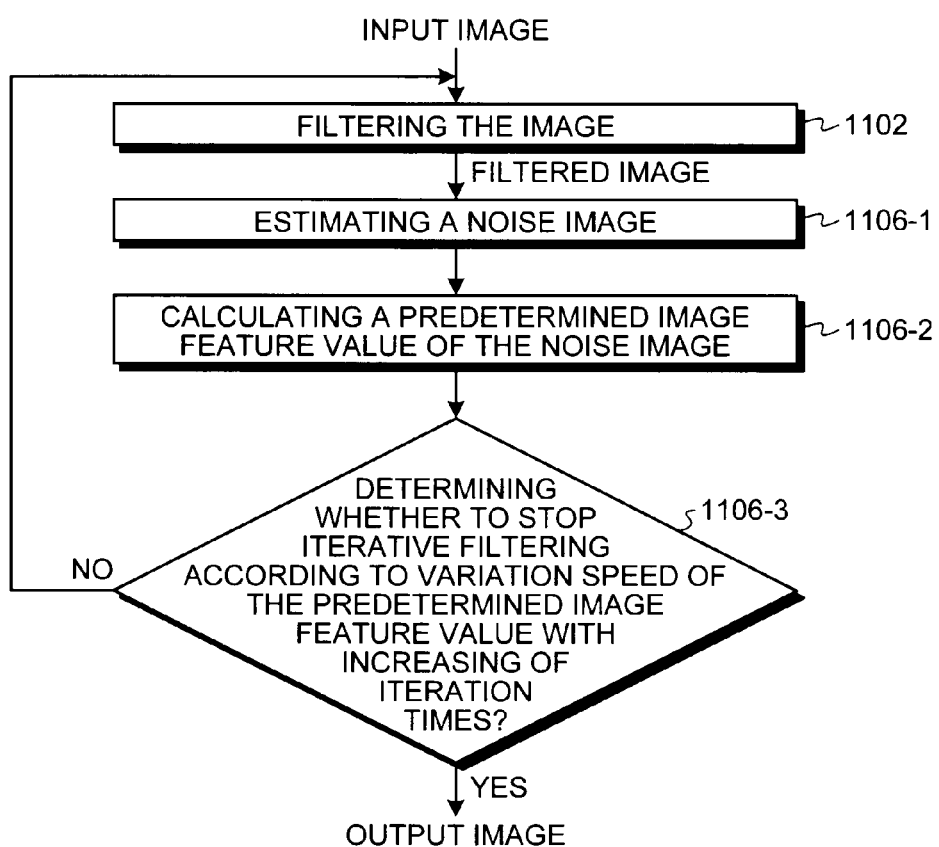
FIG. 11 is a schematic diagram illustrating the flow of the image processing method shown in the embodiment of FIG. 9.

FIGS. 8 and 9 are block diagrams which respectively illustrate the structure of an image processing apparatus according to two other specific embodiments of the disclosure, and FIGS. 10 and 11 are schematic diagrams which respectively illustrate the flow of an image processing method according to the two specific embodiments. In the embodiments illustrated in FIGS. 3-5, the variation speed of the filtered image during the iterative filtering process is represented by the decreasing speed of the correlation between the filtered image and the noise image. In the embodiments shown in FIGS. 8-11, the variation speed of the filtered image is represented by the variation speed of a predetermined image feature value of the filtered image or noise image during the iterative filtering process.

The predetermined image feature may be any image feature that reflects the variation of the filtered image during the iterative filtering process, such as the variance or standard deviation of the filtered image or noise image, the average gradient of the pixels of the filtered image or noise image, the dynamic range of the gray levels (namely, the difference between the maximum gray level and the minimal gray level) of the filtered image or noise image, or any other features that are not enumerated here.

Figure 12A:
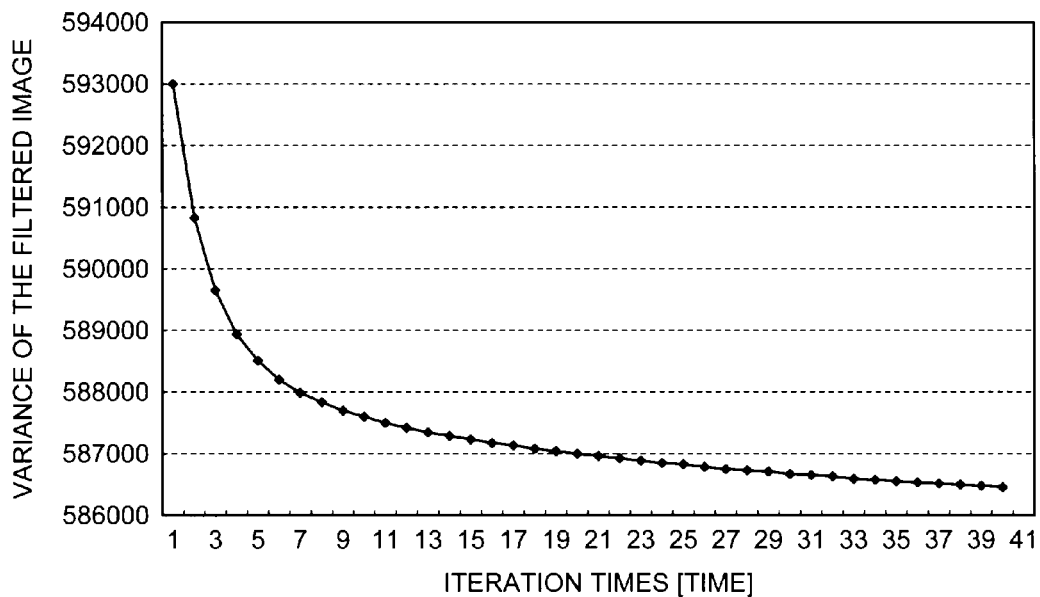
FIGS. 12A and 12B are schematic diagrams which respectively illustrate the curves reflecting the variations of the variances of a filtered image and a noise image during an iterative filtering process.
Figure 12B:
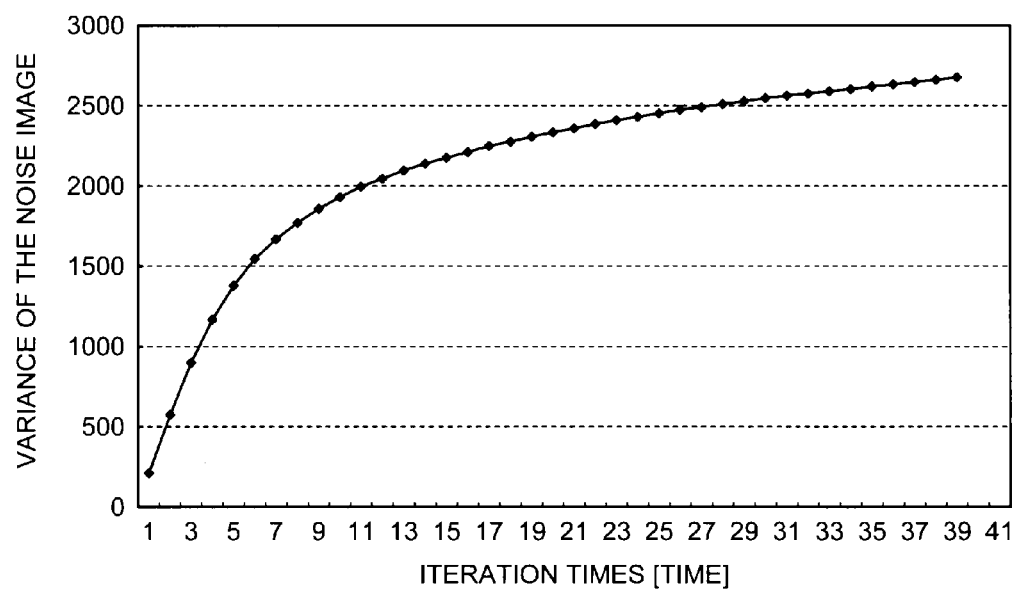

FIGS. 12A and 12B respectively illustrate exemplary variation curves of the variances of the filtered image and a noise image during an iterative filtering process. As shown in FIG. 12A, with the increase of times of iterations, the variance of the filtered image descends monotonously and the descending speed thereof is lowered gradually. As shown in FIG. 12B, with the increase of iteration times, the variance of the noise image ascends monotonously and the ascending speed thereof is lowered gradually. The noise image can be estimated by the above-mentioned method, the description of which is not repeated herein.

An embodiment of determining a filtering stopping time using the variation speed of a predetermined image feature value of the filtered image is described below by reference to FIGS. 8 and 10.

As shown in FIG. 8, an image processing apparatus 800 may include a filter 801 and an iterative filtering stopping device 803. The iterative filtering stopping device 803 may include an image feature calculation unit 803-4 and a stopping determination unit 803-3. The image processing apparatus 800 may perform an image filtering by using the method shown in FIG. 10.

Similar to the filters 101 and 301, the filter 801 is configured to perform an iterative filtering on an image input to the image processing apparatus (Step 1002 shown in FIG. 10), the description of which is not repeated here.

The filter 801 outputs the filtered image obtained from each iteration to the image feature calculation unit 803-4. The image feature calculation unit 803-4 calculates a predetermined image feature value, such as the variance or standard deviation, of the filtered image (Step 1006-1 shown in FIG. 10) and outputs the result of the calculation to the stopping determination unit 803-3. The stopping determination unit 803-3 determines whether to stop the iterative filtering according to the variation speed (e.g. the decreasing speed of the variance or standard deviation) of the image feature value (e.g. variance or standard deviation) with the increase of iteration times during the iterative filtering process. If determining the variation speed of the image feature value is smaller than or equal to a predetermined value, the stopping determination unit 803-3 indicates the filter 801 to stop the iterative filtering, otherwise, indicates the filter 801 to perform the next iteration.

As a specific example, the stopping determination unit 803-3 may calculate a feature value representing the variation speed of the predetermined image feature value during the iterative filtering process according to the calculation result of the image feature calculation unit 803-4. For example, the feature value may be the inclination or slope of a curve reflecting the variation of a predetermined image feature value with the increase of iteration times, e.g. the inclination or slope of the curve shown in FIG. 12A that may be calculated according to formulae (3)-(5), the description of which is not repeated here. Or, the feature value may be the difference, or the reciprocal of the difference, between the predetermined image feature value of the filtered image obtained from the current iteration and that of the filtered image obtained from the previous iteration, or may be any other appropriate feature values. Then, the stopping determination unit 803-3 determines whether a predetermined relation between the calculated feature value and the predetermined threshold is met, for example, in the case that the inclination, slope or difference is used as the feature value, the stopping determination unit 803-3 may determine whether the feature value is smaller than or equal to a predetermined threshold, or in the case that the reciprocal of the difference is used as the feature value the stopping determination unit 803-3 may determine whether the feature value is greater than or equal to a predetermined threshold. If the predetermined relation between the calculated feature value and the predetermined threshold is met, the stopping determination unit 803-3 indicates the filter 801 to stop the iterative filtering, otherwise, indicates the filter 801 to perform the next iteration. As in the above described embodiment/example, the above mentioned threshold may be predetermined according to the actual application scenario, for example, according to the variation curve of the image feature value shown in FIG. 12A. Such curves can be obtained by analyzing images of different types (or features). The value of the threshold may be different in different application scenarios or may be different when different feature parameters are adopted, and should not be limited to any specific value.

An embodiment of determining a filtering stopping time using the variation speed of a predetermined image feature value of the noise image is described below by reference to FIGS. 9 and 11.

As shown in FIG. 9, the image processing apparatus 900 may include a filter 901 and an iterative filtering stopping device 903. Similar to the embodiment shown in FIG. 8, the iterative filtering stopping device 903 includes an image feature calculation unit 903-4 and a stopping determination unit 903-3. Different from the embodiment shown in FIG. 8, the iterative filtering stopping device 903 may further include a noise image acquisition unit 903-1. The image processing apparatus 900 can perform an image filtering by using the method shown in FIG. 11.

Similar to the aforementioned filters 101 and 301, the filter 901 is configured to perform an iterative filtering (Step 1102 shown in FIG. 11) on an input image input to the image processing apparatus, the description of which is not repeated here.

The filter 901 outputs the filtered image obtained from each iteration to the noise image acquisition unit 903-1. The noise image acquisition unit 903-1 may evaluate, after each iteration, the noise image according to the obtained filtered image and the input image (Step 1106-1 shown in FIG. 11) by using the method described in FIG. 3 or 4, the description of which is not repeated here.

The noise image acquisition unit 903-1 outputs the acquired noise image to the image feature calculation unit

903-4. The image feature calculation unit 903-4 may calculate a predetermined image feature value of the noise image (Step 1106-2 shown in FIG. 11), such as the variance or standard deviation of the noise image, and outputs the result of the calculation to the stopping determination unit 903-3.

The stopping determination unit 903-3 may determine whether to stop the iterative filtering according to the variation speed of the image feature value of the noise image (e.g. the image feature may be the variance or standard deviation of the noise image, and in this case the variation speed may refer to the increasing speed of the variance or standard deviation) with the increase of iteration times during the iterative filtering process. If determining the variation speed of the image feature value of the noise image reaches a predetermined level, the stopping determination unit 903-3 indicates the filter 901 to stop the iterative filtering, otherwise, indicates the filter 901 to perform the next iteration.

As a specific example, the stopping determination unit 903-3 may calculate a feature value representing the variation speed of the predetermined image feature value during the iterative filtering process according to the calculation result of the image feature calculation unit 903-4. For example, the feature value may be the inclination or slope of a curve (e.g. the inclination or slope of the curve shown in FIG. 12B that may be calculated according to formulae (3)-(5), the description of which is not repeated here) reflecting the variation of the predetermined image feature value with the increase of iteration times, or the feature value may be the difference (or the reciprocal of the difference) between the predetermined image feature value of the noise image obtained from the current filtering iteration and that of the noise image obtained from the previous filtering iteration, or other appropriate feature value which is not numerated herein. Then, the stopping determination unit 903-3 determines whether a predetermined relation between the calculated feature value and a predetermined threshold is met, for example, in the case that the inclination, slope or difference is used as the feature value, the stopping determination unit 903-3 may determine whether the feature value is smaller than or equal to the predetermined threshold; and in the case that the reciprocal of the difference is used as the feature value, the stopping determination unit 903-3 may determine whether the feature value is greater than or equal to the predetermined threshold. If the predetermined relation between the calculated feature value and the predetermined threshold is met, the stopping determination unit 903-3 indicates the filter 901 to stop the iterative filtering, otherwise, indicates the filter 901 to perform the next iteration. Similar to the above described embodiment/example, the threshold here may be predetermined according to the actual application scenario. The value of the threshold may be different in different application scenarios or when different feature parameters are adopted. For example, the threshold can be predetermined according to the variation curve of the image feature value shown in FIG. 12B, wherein such curves can be obtained by analyzing images of different types (or features). The threshold is not limited to any specific value.

In the image processing apparatus and method described above with reference to FIGS. 8-11, by using the variation speed of a predetermined image feature value of the filtered image or noise image during the iterative filtering process, the iterative filtering stopping time can be effectively determined. In addition, useful information in the image is guaranteed not to be smoothed while most noise is filtered out from the image.

As a specific example, the image processing apparatus and method described above with reference to FIGS. 8-11 may calculate the variance of an image according to the following formula:

$$D = \sqrt{E[I - E(I)]^2} \quad (6)$$

wherein I represents an image (e.g. the above-mentioned filtered image or noise image), and D represents the variance of the image.

Figure 13:
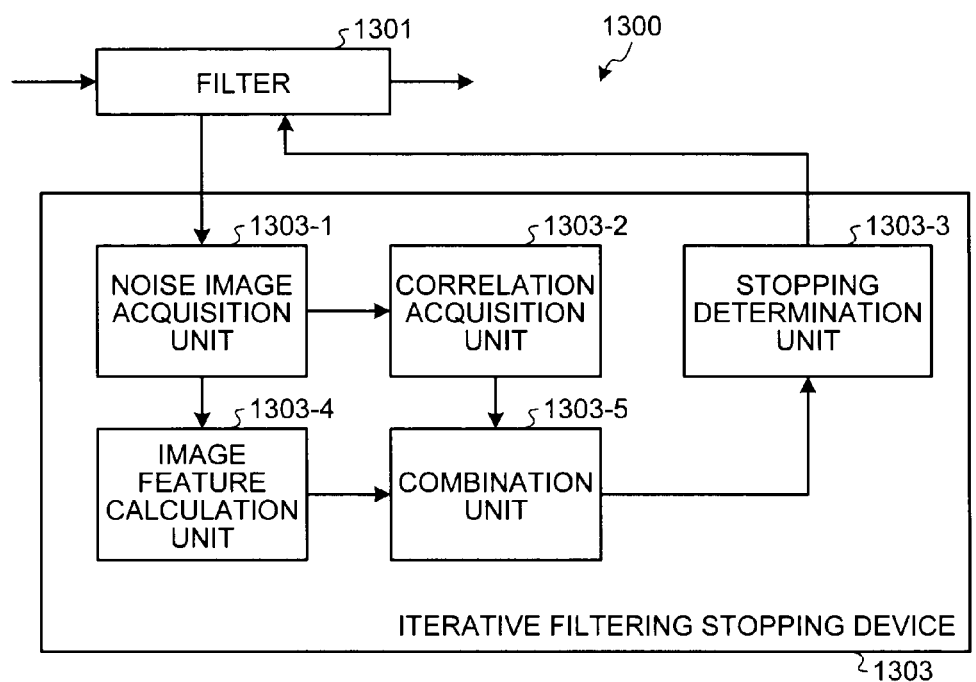
FIG. 13 is a block diagram illustrating the structure of an image processing apparatus according to another embodiment of the disclosure.
Figure 14:
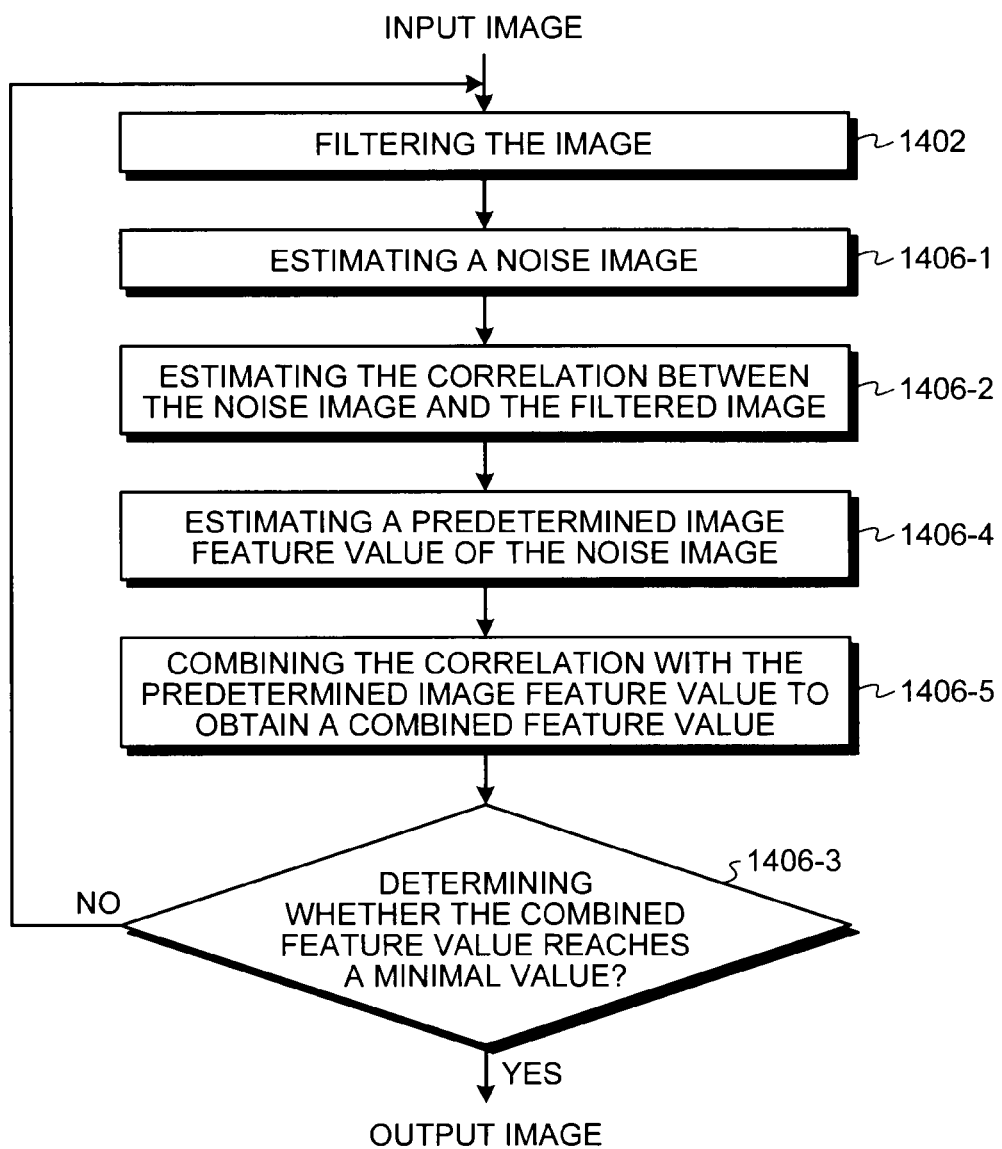
FIG. 14 is a schematic diagram showing the flow of an image processing method according to the specific embodiment of FIG. 13.
Figure 15A:
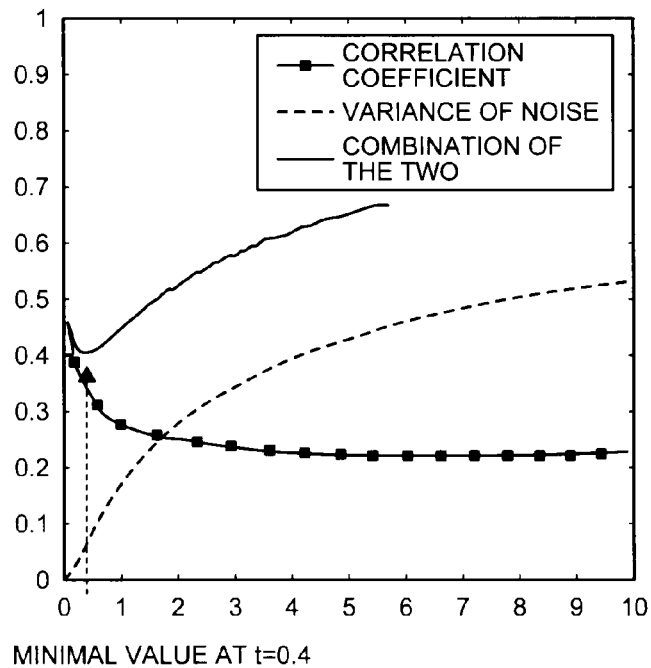
FIG. 15 is a schematic diagram showing a specific example of the specific embodiment of FIG. 13.

FIG. 13 is a block diagram illustrating the structure of an image processing apparatus according to another specific embodiment of the disclosure, and FIG. 14 is a schematic diagram illustrating the flow of an image processing method according to the specific embodiment of the FIG. 3. In the embodiments that have been described above, the correlation between a noise image and a filtered image or the variation speed of a predetermined image feature value of the noise image or filtered image during the iterative filtering process is utilized, while in the embodiment shown in FIGS. 13 and 14, the combination of the two parameters is used. As shown in FIGS. 6A, 6B and 6C, the correlation between the noise image and the filtered image decreases monotonically at the initial stage of an iterative filtering process and then ascends slowly (as shown in FIGS. 6A and 6B) or continues to decrease slowly (as shown in FIG. 6C), whereas the variance of the noise image ascends monotonically during the iterative filtering process, as shown in FIG. 12B. If the two parameters are appropriately combined (a specific combination embodiment is described below by reference to FIGS. 13-15), then the curve reflecting the variation of the generated combined feature value with the increase of iteration times will also reflect the variation of the image during the iterative filtering processing. For example, in the case where the trough of the correlation curve is delayed after the correct filtering stop time as shown in FIG. 6B, since the variance of the noise image ascends monotonically, the curve of the combined feature value will cause the trough to reach an appropriate position which is earlier than the trough shown in FIG. 6B. For another example, in the case where the correlation decreases monotonically as shown in FIG. 6C, since the variance of the noise image ascends monotonically, the curve of the combined feature value will present a trough which corresponds to the correct stopping time. FIG. 15A is a schematic diagram illustrating the variations of the correction coefficient between the noise image and the filtered image, the variance of the noise image and the combined feature value of the two parameters. In FIG. 15A, the vertical axis represents the values of the correlation coefficient, the variance and the combined feature, and the horizontal axis represents iteration time. As show in FIG. 15A, the curve of the combined feature represents a trough (the minimal value) at time point t=0.4. An iterative filtering stopping time can be determined according to the trough (minimal value) presented by the combined feature value with the increasing of iteration times.

For concise, in the example of the following description, the variance of the noise image is used as the predetermined image feature and the correlation coefficient is used to represent the correlation between the noise image and a filtered image. It should be appreciated that in other examples, other image features (e.g. standard deviation) of the noise image, or the reciprocal of the variance or standard deviation of the filtered image or the like may be used as the predetermined image feature, and other appropriate parameters that reflects the correlation between the filtered image and the noise image can be adopted, which are not numerated here.

As shown in FIG. 13, an image processing apparatus 1300 may include a filter 1301 and an iterative filtering stopping device 1303. The iterative filtering stopping device 1303 includes a noise image acquisition unit 1303-1, a correlation acquisition unit 1303-2, an image feature calculation unit 1303-4, a combination unit 1303-5 and a stopping determination unit 1303-3. The image processing apparatus 1300 can perform an image filtering by using the method shown in FIG. 14.

Similar to the filters 101 and 301, the filter 1301 is configured to perform an iterative filtering (Step 1402 shown in FIG. 14) on an input image input to the image processing apparatus, the description of which is not repeated here.

The filter 1301 outputs the filtered image obtained from each iteration to the noise image acquisition unit 1303-1. The noise image acquisition unit 1303-1 evaluates, after each iteration, a noise image according to the obtained filtered image and the input image (Step 1406-1 shown in FIG. 14) using the method described in FIGS. 3 and 4, the description of which is not repeated here.

The noise image acquisition unit 1303-1 outputs the obtained noise image to the correlation acquisition unit 1303-2 and the image feature calculation unit 1303-4. The correlation acquisition unit 1303-2 estimates the correlation between the noise image and the filtered image obtained from the current filtering iteration (Step 1406-2 shown in FIG. 14) and outputs the result of the estimation to the combined unit 1303-5. For example, the correlation acquisition unit 1303-2 may calculate the correlation coefficient between the noise image and the filtered image (using the above-mentioned method, the description of which is not repeated here) to represent the correlation between the two images.

The image feature calculation unit 1303-4 calculates a predetermined image feature value of the noise image (Step 1406-4 shown in FIG. 14), for example, the variance of the noise image (using formula (6)), and outputs the result of the calculation to the combination unit 1303-5.

The combination unit 1303-5 combines the correlation value acquired by the correlation acquisition unit 1303-2 and the variance value calculated by the image feature calculation unit 1303-4 so as to generate a combined feature value (Step 1406-4 shown in FIG. 14). For instance, supposing $C_1$ represents the monotonically-ascending variance curve of the noise image and $C_2$ represents the correlation curve of the noise image and the filtered image, the combined feature value may be represented as follows:

$$C_{combine} = f(C_1) + g(C_2) \tag{7}$$

wherein $C_{combine}$ represents the combined feature value, $f(\bullet)$ represents any mathematical variation performed on the curve $C_1$, and $g(\bullet)$ represents any mathematical variation performed on the curve $C_2$.

As an example, the combination unit 1303-5 may calculate the sum of the correlation value acquired by the correlation acquisition unit 1303-2 and the variance value calculated by the image feature calculation unit 1303-4, as the combined feature value. However, in some cases, the value range of the correlation coefficient between the filtered image and the noise image is different from that of the variance of the noise image, therefore, there may be no trough (minimal value) presented by the summation curve of the correlation value and the variance value, accordingly an adjustment is needed to match the correlation coefficient curve with the variance curve. Below is the description on some examples of combining the correlation value acquired by the correlation acquisition unit 1303-2 with the variance value calculated by the image feature calculation unit 1303-4.

As an example, an image processing apparatus (e.g. filter 1301) may normalize the original input image before performing a filtering, in other words, there may be a step of normalizing the input image (not shown) before Step 1402 shown in FIG. 14. Then, the noise image acquisition unit 1303-1 estimates, after each iteration, the noise image based on the normalized input image and the filtered image. For instance, the combination unit 1303-5 may calculate the sum of the correlation value obtained using the normalized input image (obtained from the correlation acquisition unit 1303-2) and the variance value (obtained from the image feature calculation unit 1303-4), as the combined feature value.

As another example, the image feature calculation unit 1303-4 may normalize, after each iteration, the noise image estimated by the noise image acquisition unit 1303-1 (the original input images need no normalization here), calculate the variance of the normalized noise image, and output the calculated variance to the combination unit 1303-5. The normalization may be realized by mapping the dynamic range (for example, the dynamic range of the image may be represented by $[N_{min}, N_{max}]$) of the noise image to $[0, 1]$. For input images of different types, the dynamic range of the noise image resulting from each iteration is different, thus, the normalization is not performed based on the same dynamic range. In this case, a standard dynamic range may be designated. In each iteration, the standard dynamic range may be utilized to map the dynamic range of the noise image to $[0, 1]$. For instance, the standard dynamic range of input images of a certain type may be set to be $[S_{min}, S_{max}]$ (it should be appreciated that different standard dynamic ranges can be adopted for different input images). The following formula (8) may be used for the normalization calculation:

$$N' = \frac{N}{S_{max} - S_{min}} + S_{min} \tag{8}$$

wherein N represents the pixel value of a noise image, and N' represents a normalized pixel value.

It should be appreciated that the standard dynamic range may be determined as needed and should not limited to any specific examples of the disclosure. For instance, in the case where the input image is a medical image, the standard dynamic range may be determined according to the type of the medical diagnostic apparatus acquiring the input image or according to the scanning protocol of the input image and so on.

In an example, the correlation acquisition unit 1303-2 may calculate the correlation based on the noise image (rather than the normalized noise image) estimated by the noise image acquisition unit 1303-1.

Figure 15B:
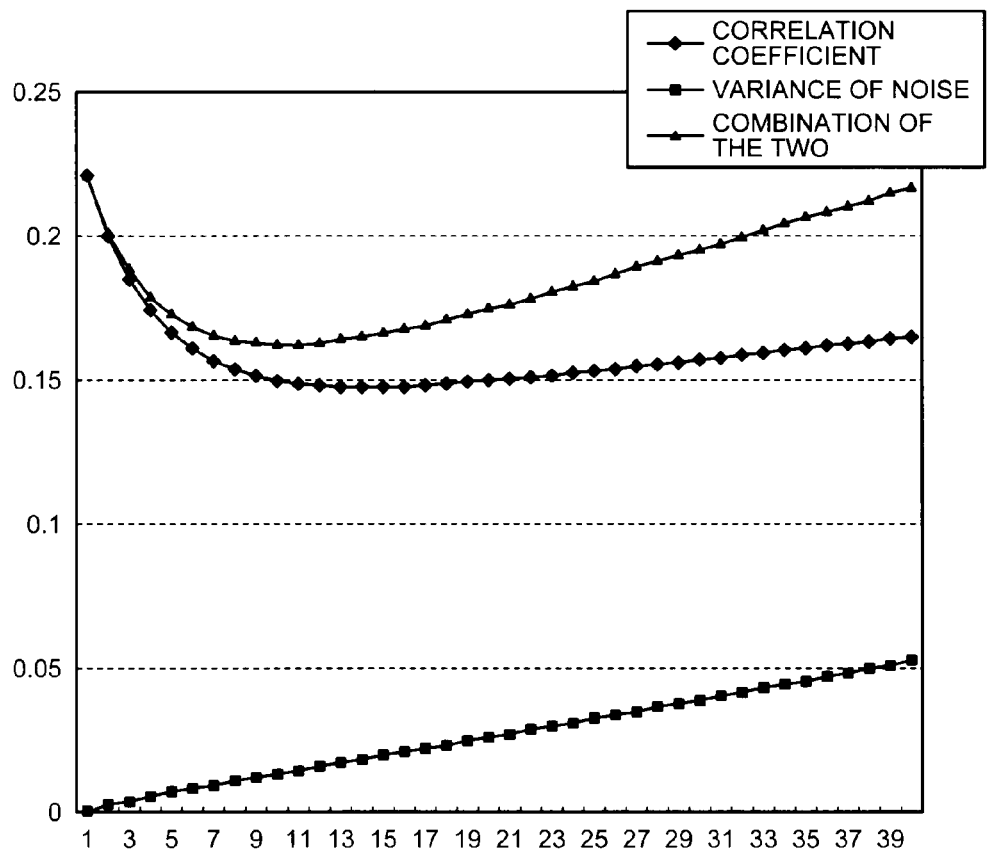

As another example, the combination unit 1303-5 may convert the calculated variance of the noise image, and then calculate the sum of the converted variance and the correlation value acquired by the correlation acquisition unit 1303-2, as the combined feature value. For instance, the combination unit 1303-5 may perform a conversion on the variance of the noise image calculated by the image feature calculation unit 1303-4, and calculate the sum of the converted variance value and the correlation value acquired by the correlation acquisition unit 1303-2, as the combined feature value. For instance, the combination unit 1303-5 may convert the variance of the noise image calculated by the image feature calculation unit 1303-4 according to the following formula:

$$V_i' = a_i(\sqrt{V_i} - \text{offset}) \tag{9}$$

wherein $V_i$ represents the variance of the noise image calculated by the image feature calculation unit 1303-4, $V_i'$ represents the converted value resulting from the conversion performed by the combination unit 1303-5 on the variance $V_i$, i represents iteration times and is equal to 1, 2, . . . ; offset represents a translation coefficient and is equal to $\sqrt{V_i}$, $V_i$ represents the variance of the noise image calculated by the image feature calculation unit 1303-4 after the first iteration, $a_i$ represents a coefficient which is greater than 1 and increases with the increasing of the iteration times, for example, $a_i=1.0+c\times i$, and c represents a predetermined constant greater than 0. In formula (9), the converted variance $V_i'$ is increased by calculating the square root of the variance $V_i$, the converted variance curve is translated using the translation coefficient offset so that the translated curve begins from 0. The increasing speed of the converted variance curve is enlarged by using the coefficient $a_i$. Additionally, the increasing speed of the converted variance curve becomes larger with the increasing of the iteration times. FIG. 15B is a schematic diagram showing the variations of the converted variance of the noise image, the correlation coefficient between the noise image and the filtered and the sum of the converted variance and the correlation coefficient with iteration times. As shown in FIG. 15B, the trough of the obtained summation curve occurs earlier than that of the correlation coefficient curve. It is shown by experiments that, if the trough of the correlation coefficient curve shown in FIG. 15B is taken as the iterative filtering stopping time, the useful information in the output image after the iterative filtering is blurred, and if the trough of the summation curve is taken as the iterative filtering stopping time, the useful information in the original input image is remained in the output image after the iterative filtering, while most noise is filtered out.

Furthermore, the parameter C in formula (9) is a value predetermined according to the actual application scenario, for example, it may be an experimental value or empirical value resulting from an analysis on images of different types (or features). It can be known from formula (9) that the smaller the parameter C is, the flatter the converted variance curve is, and on the contrary, the greater the parameter C is, the higher the ascending speed of the converted variance curve is. The value of the parameter C should be prevented from being too small, otherwise, the variation curve of the combined feature value obtained by the combination 1303-5 will descend monotonically with the increase of the iteration times and will never present a minimal value; on the other hand, the value of the parameter C should also be prevented from being too large, otherwise, the variation curve of the combined feature value obtained by the combination 1303-5 will ascend too fast with the increase of the iteration times, which may result in that the trough of the curve occurs earlier than the appropriate iterative filtering stopping time. Therefore, during an analysis on images of different types (or features), the optimal value of the parameter C may be determined according to different converted variance curves resulting from different values of the parameter C such that the summation curve of the converted variance curve and the correlation curve will present a trough at a position corresponding to an appropriate iteration stopping time point. The value of parameter C is different in different application scenarios, and should not be limited to any specific value.

In practical application the value of parameter C may be predetermined according to the type (or characteristics) of images. The same type of images (e.g. the same type of imaging device or scanning protocol) may correspond to parameter C of the same value. Different types of images may corresponds to different values of parameter C. As a specific example, a plurality of C values that are different from each other may be predetermined for different types of images and stored (in the form of a configuration file) in a storage unit (which may be built in the image processing apparatus or located outside and may be accessible to the image processing apparatus). In this way, in the actual image processing various types of images may be processed without any manual intervention, which greatly improves the degree of automation of image processing.

As another specific example, the combination unit 1303-5 may convert the variance calculated by the image feature calculation unit 1303-4 according to the following formula:

$$V_i' = \alpha \times V_i \tag{9a}$$

wherein $V_i$ represents the variance of the noise image calculated by the image feature calculation unit 1303-4, $V_i'$ represents a converted value resulting from a conversion performed by the combination unit 1303-5 on the variance $V_i$, and $\alpha$ represents the conversion parameter. $\alpha$ may be a value predetermined according to the actual application scenario, for example, an experimental value or empirical value resulting from an analysis on images of different types (or features). During analysis on images of different types (or features), the optimal $\alpha$ value may be determined according to different converted variance curves resulted by different $\alpha$ values such that the summation curve of the converted variance curve and the correlation curve will present a trough at a position corresponding to an appropriate iteration stopping time point. The value of $\alpha$ is not limited to any particular value here. In practical application, for images of each type (or characteristics), the value of $\alpha$ may be predetermined. The same $\alpha$ value corresponds to the images of the same type (e.g. the images generated by the same type of imaging device or generated according to the same type of scanning protocol), different $\alpha$ values correspond to images of different types.

The combination unit 1303-5 outputs the obtained combined feature value to the stopping determination unit 1303-3. The stopping determination unit 1303-3 may indicate the filer 1301 to stop the iterative filtering (Step 1406-3) when the combined feature value reaches the minimal value (the trough) during the iterative filtering process. Specifically, the stopping determination unit 1303-3 determines whether the combined feature value reaches the minimal value, if so, indicates the filter 1301 to stop the iterative filtering, otherwise, indicates the filter 1301 to perform the next iteration. The stopping determination unit 1303-3 may determine whether the combined feature value reaches the trough (minimal value) by using any appropriate method, for example, the stopping determination unit 1303-3 may compare the combined feature value resulting from the current filtering iteration with that resulting from the previous filtering iteration, and if the former is greater than the latter, the stopping determination unit 1303-3 may determine the combined feature value is in an ascending trend, and then stop the iterative filtering. Certainly, the stopping determination unit 1303-3 may determine whether the combined feature value reaches the trough by using other appropriate methods that are not listed herein.

In the image processing apparatus or method described above with reference to FIGS. 13-15, an iterative filtering stopping time can be effectively determined by using the combined feature value obtained by combining the correlation coefficient between the filtered image and the noise image and a predetermined image feature value of a noise image. In addition, the useful information in the input image is guaranteed not to be smoothed while most noise is filtered out.

Some embodiments of the disclosure further provide an image processing apparatus or method for performing an iterative filtering using a non-linear diffusion filtering method.

A non-linear diffusion filtering method was proposed by P. Perona and J. Malik in their paper '*Scale-Space and Edge Detection Using Anisotropic Diffusion*' (*Proceedings of IEEE*, November 1987, Computer Society Workshop on Computer Vision, pp. 16-22) (referred to as related document 2 hereinafter). It should be noted that although the method proposed in related document 2 is termed as "anisotropic diffusion", the method is in fact a non-linear diffusion, rather than a real anisotropic diffusion. Nonetheless, some papers in this art and other documents still call the method of the related document 2 as anisotropic diffusion. In related document 2, the following equation (named P-M equation) is proposed:

$$\frac{\partial I}{\partial t} = \nabla(g * \nabla I) \quad (10)$$

wherein I represents an image, and g represents a diffusion coefficient which is the function of an image gradient $|\nabla I|$;

$$g(|\nabla I|) = \frac{1}{1 + (|\nabla I|/K)^2} \quad (11)$$

wherein K is referred to as a gradient threshold which is a parameter for controlling the sensitivity to the edge of an image.

Figure 16:
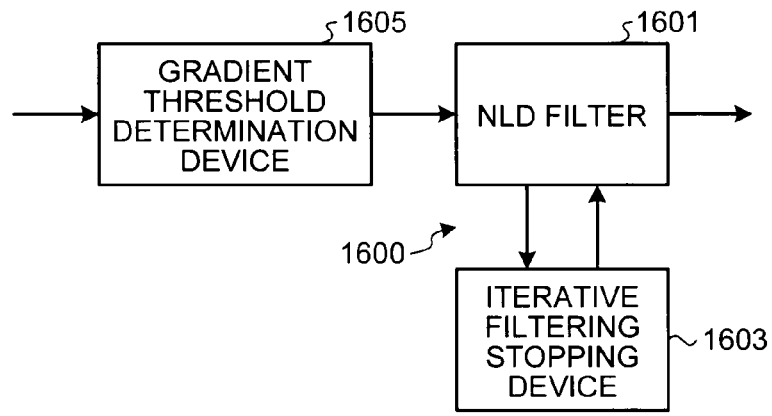
FIG. 16 is a block diagram illustrating the structure of an image processing apparatus according to another embodiment of the disclosure.
Figure 17:
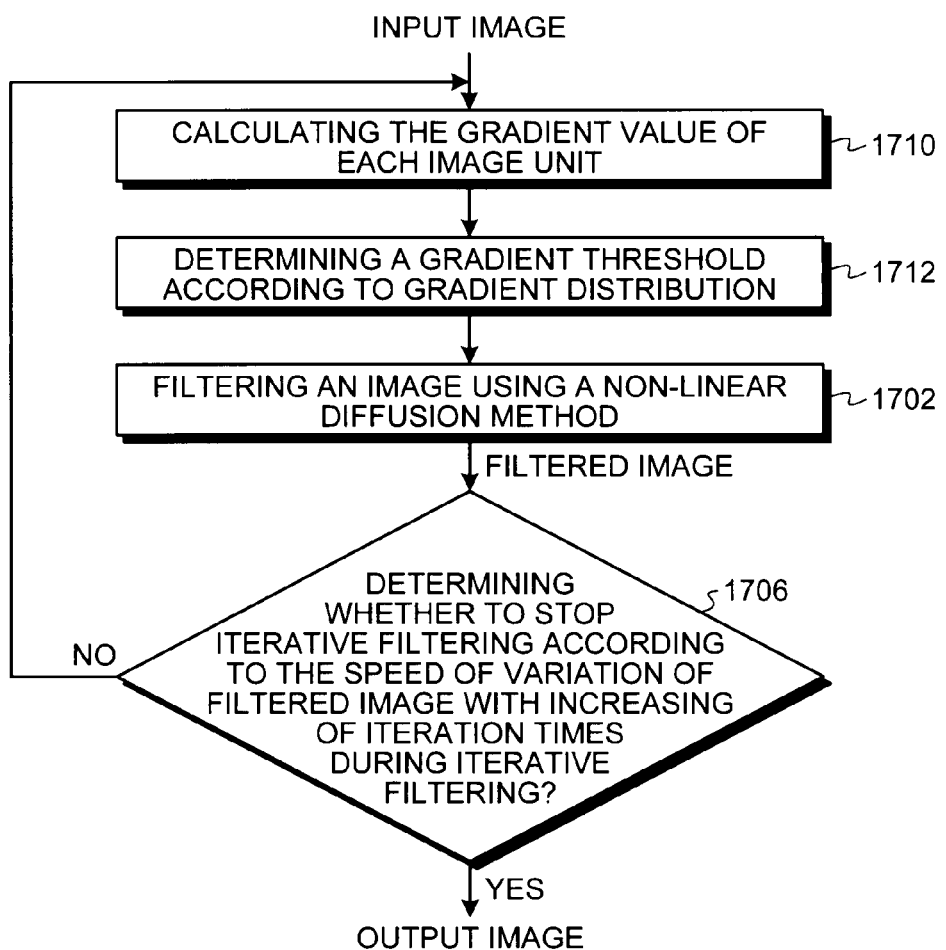
FIG. 17 is a schematic diagram illustrating the flow of an image processing method according to the embodiment of FIG. 16.

The embodiment shown in FIGS. 16-17 provides an image processing apparatus and method for determining, by using the gradient distribution of an image, a gradient threshold K for use in a non-linear diffusion filtering, wherein FIG. 16 is a block diagram illustrating the structure of an image processing apparatus according to the embodiment, and FIG. 17 is a flow chart illustrating the flow of an image processing method according to the embodiment.

As shown in FIG. 16, an image processing apparatus 1600 may include a filter 1601, a gradient threshold determination device 1605 and an iterative filtering stopping device 1603. The image processing apparatus 1600 can perform an image filtering by using the method shown in FIG. 17.

The filter 1601 is configured to perform an iterative filtering on an input image (step 1702 shown in FIG. 17) based on a non-linear diffusion filtering method and output the filtered image obtained from each iteration to the iterative filtering stopping device 1603. The filter 1601 may perform a filtering by using any non-linear diffusion filtering algorithm that is not limited here.

The iterative filtering stopping device 1603 is configured to determine whether to stop an iterative filtering according to the variation speed of the filtered image with the increase of iteration times during the filtering process (Step 1706 shown in FIG. 17). Specifically, the iterative filtering stopping device 1603 may have the similar functions and structure as the iterative filtering stopping devices 103, 303, 803, 903 or 1303 described in aforementioned embodiments/examples (e.g. the function of determining an iterative filtering stopping time using the methods illustrated in FIGS. 2-15), the description of which is not repeated here.

The gradient threshold determination device 1605 is configured to calculate, before the filter 1601 performs a filtering, the gradient of each image unit in an input image or the filtered image obtained from the previous filtering (Step 1701 shown in FIG. 17), and determine a gradient threshold according to the gradient distribution of all the image units in the image. The gradient of an image unit refers to the variation value of the gray level of the image unit compared with the image units in its neighboring domain.

Figure 18:
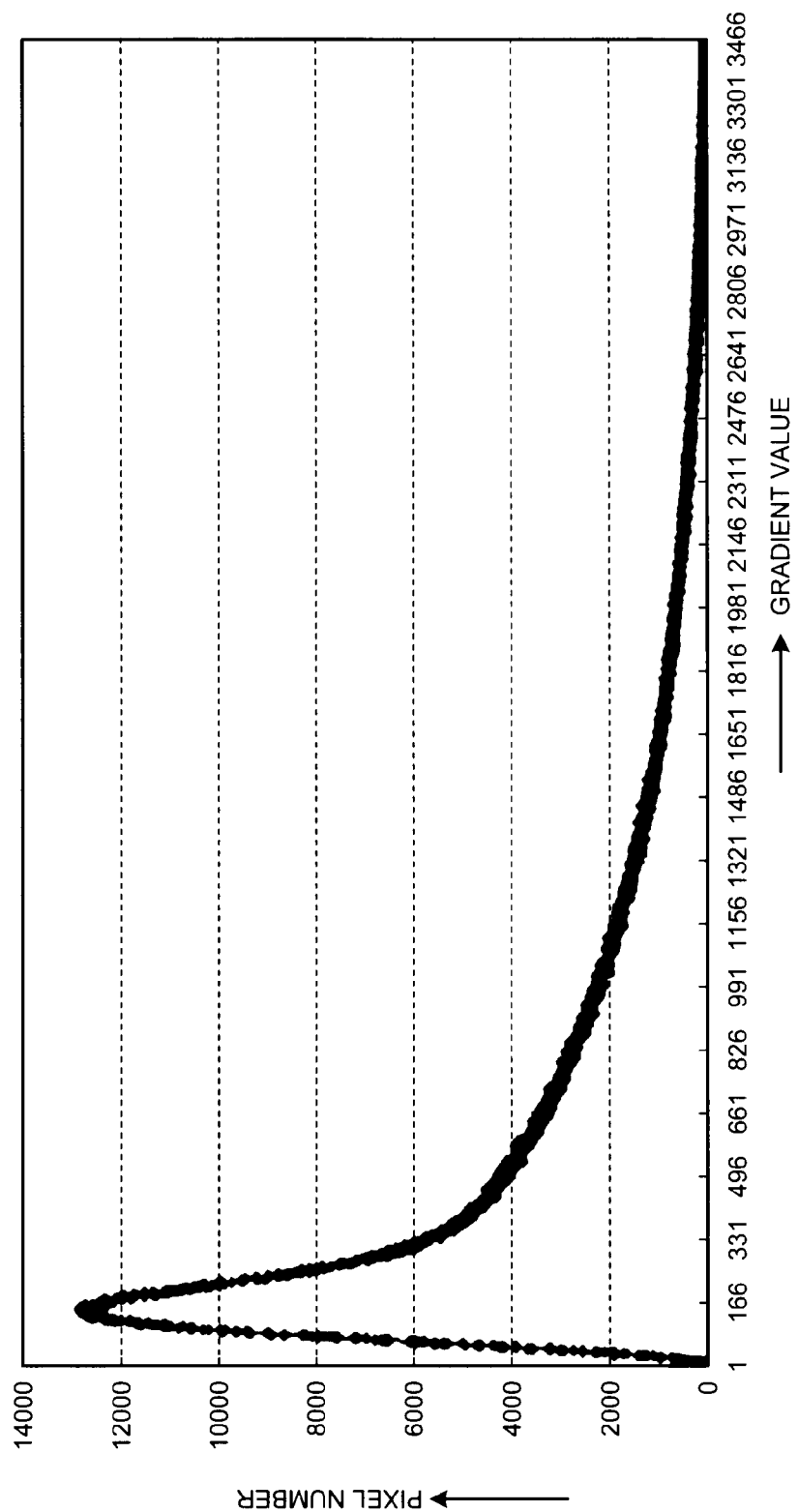
FIG. 18 is a schematic diagram illustrating an exemplary gradient distribution of each image unit in an image.

An image unit may be a pixel in an image, for example, a pixel in a two-dimensional image or a voxel in a three-dimensional image. FIG. 18 shows an example of the gradient distribution of each image unit in an image, in which the horizontal axis represents the gradient value of an image unit, and the vertical axis represents the number of the image units corresponding to a gradient value. As an example, the gradient threshold determination unit 1605 may acquire a proportion value corresponding to an input image, and calculate a gradient threshold K according to the proportion value and the gradient distribution such that the ratio of the number of the image units having a gradient value smaller than the gradient threshold K to the number of all the image units in the image is approximately equal to the proportion value. Of course, the proportion can be subjected to any other mathematical variations so as to, for example, make the proportion reflect the ratio of the number of the image units having a gradient value smaller than the gradient threshold K to the number of the image units having a gradient value no smaller than the gradient threshold K.

As a specific example, the gradient values of the image units may be sorted in an ascending order or a descending order, and the gradient value with a rank corresponding to the proportion value may be determined as a gradient threshold such that the ratio of the number of the image units having a gradient value smaller than the gradient threshold K to the number of all the image units in the image is approximately equal to the proportion value. As another specific example, the histogram of the gradients of the image units in the image may be calculated, and a gradient threshold may be determined according to the histogram such that the ratio of the number of the image units having a gradient value smaller than the gradient threshold K to the number of all the image units in the image is approximately equal to the proportion value.

The proportion value may be a value that is predetermined according to the type or characteristics (e.g. the imaging device or scanning protocol of a medical image) of the input image. The proportion value may be represented with P, wherein P is greater than 0 and smaller than 1. The same type of images may correspond to the same proportion value, and different types of images may correspond to different proportion values. It should be appreciated that in actual application scenarios, a corresponding proportion value may be predetermined for the same type of images by analyzing a plurality of images of this type and the predetermined proportion value may be used in the subsequent non-linear diffusion filtering. For instance, a plurality of predetermined proportion values each of which corresponds to each of a plurality of types of images may be stored in a storage unit, for example, in the form of configuration file. The storage unit may be built in the image processing apparatus or located outside and accessible to the image processing apparatus. In an actual non-linear diffusion filtering, the gradient threshold determination device 1605 may acquire a stored proportion value corresponding to the type or characteristics (the type of an imaging device or scanning protocol) of an input image from the storage unit. In this way, the parameter needs not to be set manually, which improves the automation of image processing. As being different in different application scenarios, the proportion value is not specifically limited here.

The gradient threshold determination device 1605 may calculate the gradient value of an image unit in an image by using any appropriate method and determine the gradient threshold according to the gradient distribution of all the image units in the image. As an example, supposing the image is an n-dimensional image (n≥1), the gradient value of an image unit may be calculated according to the following formula:

$$|I_{grad}(D_1, D_2, \ldots, D_n)| = \sqrt{I_{D_1}^2 + I_{D_2}^2 + \ldots I_{D_n}^2} \qquad (12)$$

wherein $D_1, D_2, \ldots, D_n$ represents n dimensions of an image, $|I_{grad}(D_1, D_2, \ldots, D_n)|$ represents the gradient value of a pixel of an image located at $(D_1, D_2, \ldots, D_n)$, and $I_{D_k}$ (1≤k≤n) represents the derivative of the pixel in the $D_k$th dimension.

In each iteration, the gradient threshold determination device 1605 outputs the calculated gradient threshold to the filter 1601, and the filter 1601 performs a non-linear diffusion filtering (Step 1702 shown in FIG. 17) according to the gradient threshold determined by the gradient threshold determination device 1605.

The image processing apparatus and method according to the embodiments of the disclosure are applicable to the filtering processing of various types of one-dimensional or multi-dimensional (e.g. two-dimensional or three-dimensional) images. For example, the image processing apparatus and method are applicable to the noise reduction of medical images, e.g. images formed by the data obtained by a medical diagnostic apparatus. As an example, each step of the aforementioned method and each module and/or unit of the aforementioned apparatus may be implemented by software, firmware and hardware in a medical diagnostic apparatus (e.g. X-ray diagnostic apparatus, UL diagnostic apparatus, CT apparatus, MRI diagnostic apparatus or PET apparatus) or the combination thereof and serve as one part of the medical diagnostic apparatus. As an example, the method and/or apparatus disclosed in this invention can be applied to existing medical diagnostic apparatuses after some modifications are made on some component(s) of existing medical diagnostic apparatuses. As another example, each step of the aforementioned method and each module and/or unit of the aforementioned apparatus may be implemented by a device independent from the medical diagnostic apparatus. Each module and unit of the aforementioned apparatus is configured via software, firmware, hardware or the combination thereof by a specific means or in a way that is well known by the skilled in this art, the description of which is not repeated here.

As an example, each step of the aforementioned method and each module and/or unit of the aforementioned apparatus may be implemented by software, firmware, hardware or the combination thereof. In the case where the steps or modules and/or units are implemented by software or firmware, a software program for realizing the method may be installed on a computer having a dedicated hardware structure (e.g. the general computer 1900 shown in FIG. 19) from a storage medium or network, wherein the computer is capable of implementing various functions when installed with various programs.

Figure 19:
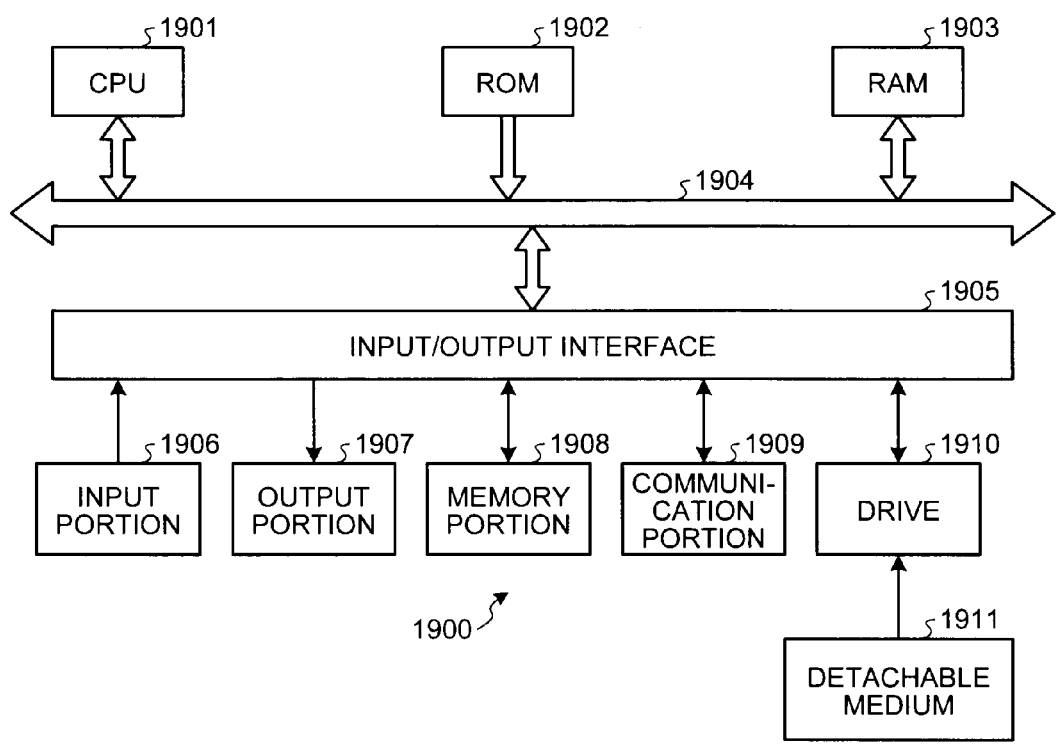
FIG. 19 is a block diagram illustrating the structure of a computer for realizing the image processing method of the disclosure.

In FIG. 19, an operation processing unit (namely, a CPU) 1901 implements various processing via a program stored in a read-only memory or a program that is loaded on a random access memory (RAM) 1903 from a storage part 1908. The data required for the various processing of the CPU 1902 is stored in the RAM 1903 as needed. The CPU 1901, the ROM 1902 and the RAM 1903 are linked with each other via a bus 1904. An input/output interface 1905 may also be linked on the bus 1904.

The following components are linked with the input/output interface 1905: an input part 1906 (including keyboard, mouse and the like), an output part 1907 (including display (e.g. cathode-ray tub, liquid crystal display (LCD) and the like), loudspeaker and the like), a memory part 1908 (including hard disc and the like), and a communication part 1909 (including network interface card (e.g. LAN card, modem and the like). The communication part 1909 implements a communication processing via a network (e.g. Internet) and may be linked with the input/output interface 1905 as needed. A detachable medium 1911, such as magnetic disc, compact disc, magneto optical disc, semiconductor memory and the like, is mounted on a drive 1910 as needed such that the computer program read from the detachable medium 1911 can be installed on the memory part 1908 as needed.

In the case where the aforementioned series of processing is realized by a piece of software, programs constituting the piece of software is installed from a network, for example, Internet, or a storage medium, for example, the detachable medium 1911.

Those skilled in the art should understand that the storage medium is not limited to the detachable medium 1911 shown in FIG. 19 which is distributed separated from a device so as to provide a user with a program and in which programs are stored. The detachable medium 1911 may be, for example, magnetic disc (including floppy disc (registered trademark)), compact disc (including compact disc read-only memory (CD-ROM) and digital video disc (DVD), magneto optical disc (including mini disc (MD) (registered trademark))), and semiconductor memory. Or the storage medium may be the hard disc included in the ROM 1902 or the storage part 1908, and programs are stored in the storage medium and can be distributed to users along with the storage medium.

The disclosure further discloses a program product in which machine-readable instruction codes are stored. And the aforementioned method can be implemented when the instruction codes are read and executed by a machine.

Accordingly, a storage medium for bearing the program product in which machine-readable instruction codes are stored is also included in the disclosure, the storage medium including but not limited to floppy disc, compact disc, magneto optical disc, memory card, memory stick and the like.

In the description above on specific embodiments of the disclosure, the features described and/or shown for an embodiment may be used in one or more other embodiments in the same or similar way, or combined with those of the other embodiments, or replace those of the other embodiments.

It should be emphasized that the term 'include/comprise' used herein refers to the existence of a feature, an element, a step or a component, but not exclusive of the existence or addition of one or more other features, elements, steps or components.

In the above-mentioned embodiments and examples, appended drawing reference signs consisting of figures are used for representing steps and/or units. It should be understood by one of ordinary skill in the art that these appended drawing reference signs are only used for facilitating description and drawing but not for indicating a limitation on order or any other aspects.

In addition, the method disclosed in the disclosure may be implemented sequentially, synchronously or independently in accordance with other time sequences, not limited to the time sequence described herein. Therefore, the implementation order of the method described herein is not limitation to the technical scope of the disclosure.

Although the disclosure is described in connection with the embodiments thereof, it should be understood that all the above-mentioned embodiments and examples are exemplary but not limitative. Various modifications, improvements or equivalents can be devised by those skilled in the art without departing from the spirit and scope of appended claims, with the understanding that and those modifications, improvements or equivalents belong to the protection scope of the disclosure.

What is claimed is:

1. An image processing apparatus, comprising:
a filter for performing an iterative filtering on an input image; and
an iterative filtering stopping device for determining whether to stop the iterative filtering based on a filtered image obtained from each iteration of the iterative filtering with increasing of iteration times, wherein the iterative filtering stopping device comprises:
a noise image acquisition unit for evaluating, after the filter completes each iteration, a noise image according to the filtered image obtained from the iteration and the input image;
a correlation acquisition unit for evaluating a correlation between the noise image and the filtered image; and
a stopping determination unit for calculating a feature value representing decreasing speed of the correlation during the iterative filtering process, determine whether a predetermined relation is met between the feature value and a predetermined threshold, and stop the iterative filtering if the predetermined relation is met between the feature value and the predetermined threshold.

2. The image processing apparatus according to claim 1, wherein the correlation acquisition unit is configured to calculate a correlation coefficient between the noise image and the filtered image to represent the correlation.

3. The image processing apparatus according to claim 2, wherein the feature value is an inclination value of a curve reflecting decreasing of the correlation coefficient with the increasing of iteration times during the iterative filtering.

4. The image processing apparatus according to claim 1, wherein the predetermined threshold is a value predetermined according to characteristics of the input image.

5. An image processing apparatus, comprising:
a filter for performing an iterative filtering on an input image; and
an iterative filtering stopping device for determining whether to stop the iterative filtering based on a filtered image obtained from each iteration of the iterative filtering with increasing of iteration times, wherein the iterative filtering stopping device comprises:
an image feature calculation unit for calculating a value of a predetermined image feature of the filtered image after each iteration; and
a stopping determination unit for determining whether to stop the iterative filtering according to a variation speed of the predetermined image feature value with the increasing of iteration times.

6. The image processing apparatus according to claim 5, wherein the iterative filtering stopping device further comprises:
a noise image acquisition unit for evaluating, after the filter completes each iteration, a noise image according to the filtered image obtained from the iteration and the input image,
wherein the image feature calculation unit is configured to calculate a predetermined image feature value of the noise image to reflect the predetermined image feature of the filtered image.

7. The image processing apparatus according to claim 5, wherein the predetermined image feature is a variance or standard deviation of an image.

8. The image processing apparatus according to claim 5, wherein the stopping determination unit is configured to:
calculate a feature value representing a variation speed of the predetermined image feature during the iterative filtering, determine whether a predetermined relation is met between the feature value and a predetermined threshold, and stop the iterative filtering if the predetermined relation is met between the feature value and the predetermined threshold.

9. The image processing apparatus according to claim 8, wherein the feature value is an inclination value of a curve reflecting variation of the predetermined image feature with the increasing of iteration times during the iterative filtering.

10. An image processing apparatus, comprising:
a filter for performing an iterative filtering on an input image; and
an iterative filtering stopping device for determining whether to stop the iterative filtering based on a filtered image obtained from each iteration of the iterative filtering with increasing of iteration times, wherein the iterative filtering stopping device further comprises:
a noise image acquisition unit for evaluating, after the filter completes each iteration, a noise image according to the filtered image obtained from the iteration and the input image;
a correlation acquisition unit for evaluating a correlation between the noise image and the filtered image;
an image feature calculation unit for calculating a predetermined image feature value of the noise image;
a combination unit for combining the correlation and the predetermined image feature value of the noise image to obtain a combined feature value; and
a stopping determination unit for stopping the iterative filtering when the combined feature value is minimum during the iterative filtering.

11. The image processing apparatus according to claim 10, wherein the predetermined image feature is variance or standard deviation of an image.

12. The image processing apparatus according to claim 10, wherein the image feature calculation unit is further configured to perform a conversion on the calculated predetermined image feature value of the noise image to obtain a converted predetermined image feature value, and
the combination unit is configured to calculate the sum of the correlation and the converted predetermined image feature value, as the combined feature value.

13. The image processing apparatus according to claim 10, wherein the correlation acquisition unit is configured to calculate a correlation coefficient between the noise image and the filtered image to represent the correlation.

14. The image processing apparatus according to claim 1, wherein the filter is configured to perform the filtering by using a non-linear diffusion method.

15. The image processing apparatus according to claim 14, further comprising:
a gradient threshold determination device for calculating, before the filter performs each iteration, a gradient value of each image unit in the input image or the filtered image obtained from a previous iteration, and determining a gradient threshold according to gradient distribution of all image units in the image, wherein the filter is configured to perform, by using a non-linear diffusion method, each filtering iteration using the gradient threshold determined by the gradient threshold determination device.

16. The image processing apparatus according to claim 15, wherein the gradient threshold determination device is configured to:

acquire a proportion value corresponding to the input image and calculate the gradient threshold according to the gradient distribution and the proportion value, a ratio of number of image units having a gradient value smaller than the gradient threshold in the image to number of all image units in the image being approximately equal to the proportion value.

17. The image processing apparatus according to claim 16, wherein the proportion value is a value predetermined according to characteristics of the input image.

18. The image processing apparatus according to claim 1, wherein the input image is a medical image formed by data obtained by a medical diagnostic apparatus.

\* \* \* \* \*